(12) United States Patent
Damask

(10) Patent No.: US 6,891,674 B2
(45) Date of Patent: May 10, 2005

(54) METHODS AND APPARATUS FOR FREQUENCY SHIFTING POLARIZATION MODE DISPERSION SPECTRA

(75) Inventor: Jay N. Damask, Annapolis, MD (US)

(73) Assignee: Yafo Networks, Inc., Hanover, MD (US)

(*) Notice: Subject to any disclaimer, the term of this patent is extended or adjusted under 35 U.S.C. 154(b) by 138 days.

(21) Appl. No.: 10/013,890

(22) Filed: Dec. 7, 2001

(65) Prior Publication Data

US 2002/0080467 A1 Jun. 27, 2002

Related U.S. Application Data

(60) Provisional application No. 60/251,765, filed on Dec. 7, 2000.

(51) Int. Cl.[7] .......................... G02B 27/28; G02F 1/03; H04B 10/00
(52) U.S. Cl. ...................... 359/497; 359/499; 359/484; 359/256; 398/152
(58) Field of Search ............................... 359/238, 245, 359/246, 256, 301–308, 497–499, 484, 494; 385/11; 398/65, 81, 147, 152

(56) References Cited

U.S. PATENT DOCUMENTS

| | | |
|---|---|---|
| 4,341,442 A | 7/1982 | Johnson |
| 5,430,795 A | 7/1995 | Taga et al. |
| 5,473,457 A | 12/1995 | Ono |
| 5,587,827 A | 12/1996 | Hakimi et al. |
| 5,600,738 A | 2/1997 | Bergland et al. |
| 5,659,412 A | 8/1997 | Hakki |
| 5,793,511 A | 8/1998 | Bulow |
| 5,796,510 A | 8/1998 | Yao |
| 5,822,100 A | 10/1998 | Robinson et al. |
| 5,859,939 A | 1/1999 | Fee et al. |
| 5,930,414 A | 7/1999 | Fishman et al. |
| 5,978,125 A | 11/1999 | Yao |
| 6,011,253 A | 1/2000 | Hakki |
| 6,104,515 A | 8/2000 | Cao |
| 6,130,766 A | 10/2000 | Cao |
| 6,252,711 B1 * | 6/2001 | Damask et al. .............. 359/498 |
| 6,271,952 B1 | 8/2001 | Epworth |
| 6,282,333 B1 | 8/2001 | Dultz et al. |
| 2001/0024538 A1 * | 9/2001 | Khosravani et al. .......... 385/11 |
| 2002/0015547 A1 * | 2/2002 | Patel ........................... 385/11 |

FOREIGN PATENT DOCUMENTS

| | | |
|---|---|---|
| WO | WO 99/53363 A2 | 10/1999 |
| WO | WO 00/03505 A1 | 1/2000 |
| WO | WO 00/13056 A2 | 3/2000 |
| WO | WO 00/36459 A1 | 6/2000 |
| WO | WO 00/65404 A1 | 11/2000 |
| WO | WO 01/40831 | 6/2001 |
| WO | WO 01/48957 | 7/2001 |
| WO | WO 01/61303 | 8/2001 |
| WO | Wo 01/61385 | 8/2001 |

OTHER PUBLICATIONS

Betti et al., "Phase Noise and Polarization State Insensitive Optical Coherent Systems," Journal of Lightwave Tech., vol. 8, No. 5, at 756–76 (May 1990).

(Continued)

*Primary Examiner*—Georgia Epps
*Assistant Examiner*—Jack Dinh
(74) *Attorney, Agent, or Firm*—Brett Alten

(57) ABSTRACT

A polarization mode dispersion generator for generating polarization mode dispersion ("PMD") spectra is provided. The generator includes a plurality of birefringent stages, each stage including a differential group delay ("DGD") element and a phase-shifting element. The generator is capable of inducing an amount of polarization mode-mixing between at least one adjacent pair of stages. The shape of a PMD spectrum can be preserved while frequency shifting the spectrum in either direction. Alternatively, the shape of the PMD spectrum can be changed without frequency shifting.

57 Claims, 25 Drawing Sheets

OTHER PUBLICATIONS

Bulow, "Operation of Digital Optical Transmission System with Minimal Degradation Due to Polarisation Mode Dispersion," Electronics Letters, vol. 31, No. 3, at 214–15, (Feb. 2, 1995).

Bulow, "Limitation of Optical First–Order PMD Compensation," OFC/IOOC '99 Technical Digest, vol. 2, at 74–76 (Feb. 1999).

Bulow et al., "PMD Mitigation at 10Gbits/s Using Linear and Nonlinear Integrated Electronics Equalizer Circuits," Electronic Letters, vol. 36, No. 2, at 163–64, (Jan. 20, 2001).

Bulow et al., "Electronic Equalization of Fiber PMD–Induced Distortion at 10Gbits/s" OFC Technical Digest, at 151–52, (Feb. 1998).

Cariali et al., "Electronic Compensation of PMD and Chromatic Dispersion with an IC in Gbits/s Transmission System," Electronic Letters, vol. 36, No. 10 at 889–91,(May 11, 2000).

Chbat, "Mitigation of Polarization Mode Dispersion" LEOS '99, vol. 1, at 151–52, (Nov. 1999).

Chbat et al., "Long Term Field Demonstration of Optical PMD Compensation on an Installed OC–192 Link," OFC/IOOC '99 Technical Digest, vol. Suppliement, at 12–1/12–3, (Feb. 1999).

Chen, "System Impairment Due to Polarization Mode Dispersion," OFC/IOOC '99 Technical Digest, vol. 2, at 77–79, (Feb. 1999).

Chiba et al., "Polarization Stabilizer Using Liquid Crystal Rotatable Waveplates," Journal of Lightwave Technology, vol. 17, No. 5, at 885–890, (May 1999).

Chowdury et al., Measurment of Dispersion Compensating Module Polarization–Mode Dispersion Statistics, OFC '97, at 160–61, (1997).

Evans, "The Birefringent Filter," Journal of the Optical Society of America, vol. 39, No. 3, at 229–42 (Mar. 1949).

Fini et al., "Accumulation of Polarization–Mode Dispersion in Cascades of Compensated Optical Fibers," IEEE Photonics Technology Letters, vol. 13, No. 2, at 124–26, (Feb. 2001).

Gisin et al., "Polarization Mode Dispersion: Time Verses Frequency Domains," Optics Communications, vol. 89, Nos. 2,3,4 at 316–23, (May 1992).

Glingener et al., "Polarization Mode Dispersion Compensation at 20 Gb/s with a Compact Distributed Equalizer in LiNbO3," OFC/IOOC '99 Technical Digest, vol. Supplement, at PD29/I–PD29/3 (Feb. 1999).

Hakki, "Polarization Mode Dispersion Compensation By Phase Diversity Detection," IEEE Photonics Technology Letters, vol. 9, No. 1, at 121–23 (Jan. 1997).

Harris et al., "Optical Network Synthesis Using Birefringent Crystals. *I. Synthesis of Lossless Networks of Equal–Length Crystals," Journal of the Optical Society of America, vol. 54, No. 10, at 1267–79 (Oct. 1964).

Heismann, "Tutorial: Polarization Mode Dispersion: Fundamentals and Impact on Optical Communications Systems," ECOC '98, vol. Supplement, at 51–79 (Sep. 1988).

Heismann et al., "Automatic Compensation of 1st Order Polarization Mode Dispersion in a 10 Gb/s Transmission System," ECOC '98, vol. 1 at 529–30 (Sep. 1998).

Hinz et al., "Polarization Mode Dispersion Compensation for 6ps, 40 Gbit/s Pulses Using Distributed Equalizer in LiNbO3," Electronics Letters, vol. 35, No. 14 at 1185–86 (Jul. 8, 1999).

Ishikawa et al., 40–Gbit/s Transmission Over High PMD Fiber with Automatic PMD Compensation, APCC/OECC '99, vol. 1 at 424–27 (Oct. 1999).

Kikuchi, "Analysis of Signal Degree of Polarization Degradation Used as Control Signal for Optical PMDC," Journal of Lightwave Technology, vol. 19, No. 4 at 480–86 (Apr. 2001).

Kudou et al., "Theoretical Basis of Polarization Mode Dispersion Equalization Up to the 2nd Order," Journal of Lightwave Technology, vol. 18, No. 4, 614–17 (Apr. 2000).

Lee et al., Adjustable Compensation of Polarization Mode Dispersion Using a High–Birefrngence Nonlinearly Chirped Fiber Bragg Grating, IEEE Photonics Technology Letters, vol. 11, No. 10 at 1277–79 (Oct. 1999).

Mollar, "Filter Synthesis for Braodband PMD Compensation in WDM Systems," IEEE Photonics Technology Letters, vol. 12, No. 9 at 1258–60 (Sep. 2000).

Moller et al., "Spectral Resolved PMD Vector Monitoring Using a Scanning Fabry–Perot Filter and a Polarimeter," LEOS (Laser and Electro–Optics Society) '00—13th Annual/IEEE vol. 1, No. TuJ4 at 220–221 (Nov. 13–16, 2000).

Noe et al., "Polarization Mode Dispersion Compensations at 20 Gb/s with Fiber–Based Distribution Equalizer," http://ont.uni–paderborn.de/publikationen/ELPM982.html,at 1–5 (viewed and printed Feb. 8, 2001).

Noe et al., "Fiber–Based Distribution PMD Compensation at 20 GB/s," ECOC '98, vol. 3 at 157–58 (Sep. 1998).

Noe et al., "Integrated Optical LiNbO3 Distributed Polarization Mode Dispersion Compensator in 20–Gbit/s Transmission System," Electronic Letters, vol. 35, No. 8 at 652–54 (Apr. 15, 1999).

Ozeki et al., "Polarization Mode Dispersion Equalization Experiment Using a Variable Equalizing Optimal Circuit Controlled by a Pulse–Waveform Comparision Algorithm," OFC '94 Technical Digest at 62–64 (Nov. 4, 1994).

Patcher et al., "Component for 2nd Order Compensation of Polarization Mode Dispersion," Electronic Letters, vol. 33, No. 13 at 1157–59 (Jun. 19, 1997).

Pua et al., "An Adaptive 1st Order Polarization Mode Dispersion Compensation System Aided by Polarization Scrambling: Theory and Demostration," Journal of Lightwave Technology, vol. 18, No. 6 at 832–41 (Jun. 2000).

Roy et al., "A Simple Dynamic Polarization Mode Dispersion Compensator," OFC/IOOC '99 Technical Digest, vol. 1, at 275–78 (Feb. 1999).

Sandel et al., "Optical Polarization Mode Dispersion Compensation of 2.4 bit Durations of Differential Group Delay at 40 Gbit/s," Electronic Letetrs, vol. 35, No. 16 at 1365–67 (Aug. 5, 1999).

Sandel et al., "Automatic Polarisation Mode Dispersion Compensation in 40 Gbit/s Optical Transmission System," Electronics Letters, vol. 34, No. 23 at 2258–59 (Nov. 12, 1998).

Shtiaf et al., A Compensator for the Effects of High–Order Polarization Mode Disperison in Optical Fibers,: IEEE Photonics Technology Letters, vol. 12, No. 4 at 434–36 (Apr. 2000).

Sobiski et al., "Fast 1st Order PMD Compensation with Low Insertion Loss fo 10 Gbit/s System," Electronics Letters, vol. 37, No. 1 at 46–48 (Jan. 4, 2001).

Takahashi et al., "Automatic Compensation Techniques for Timewise Fluctuating Polarization Mode Dispersion in In–Line Amplifier Systems," Electronics Letters, vol. 30, No. 4 at 348–49 (Feb. 17, 1994).

Watley et al. "Field Evaluation of an Optical PMD Compensator Using an Installed 10 Gbit/s System," OFC '00, vol. 3, No. Th B6 at 37–39 (Mar. 2000).

Winters et al., "Experimental Equalization of Polarization Dispestion," IEEE Photonics Technology Letters, vol. 2, No. 8 at 591–93 (Aug. 1990).

Winters ry al., "Adaptive Nonlinear Cancellation for High–Speed Fiber–Optic Systems," Journal of Lightwave Technology, vol. 10, No. 7 (Jul. 1992).

* cited by examiner

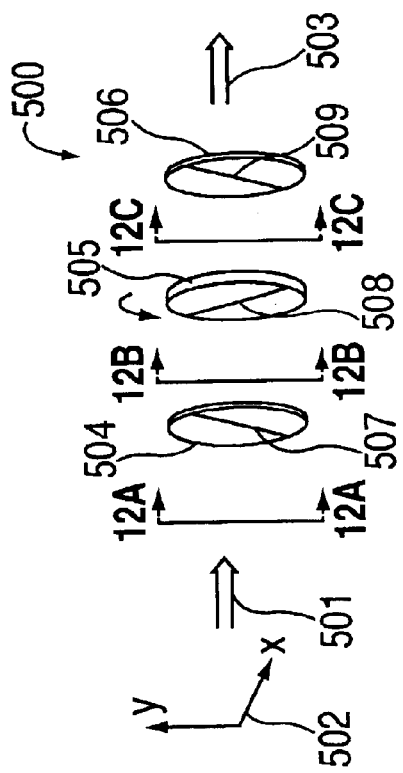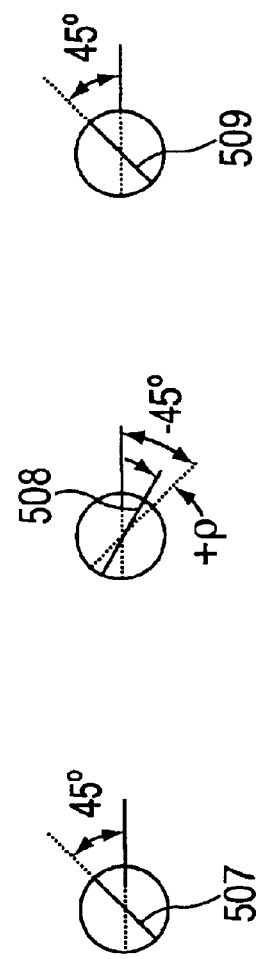

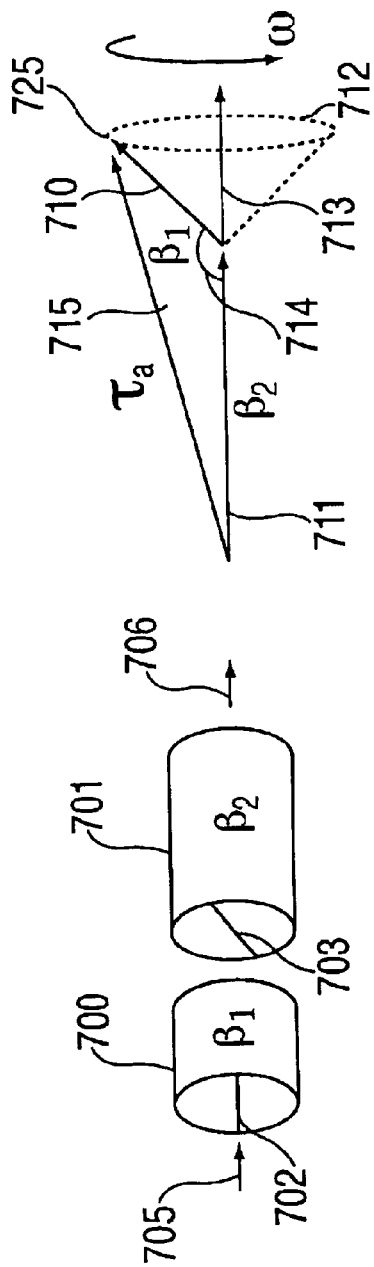
FIG. 15
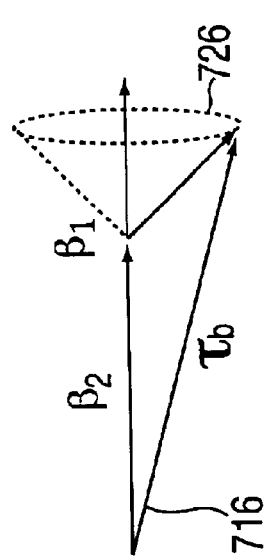
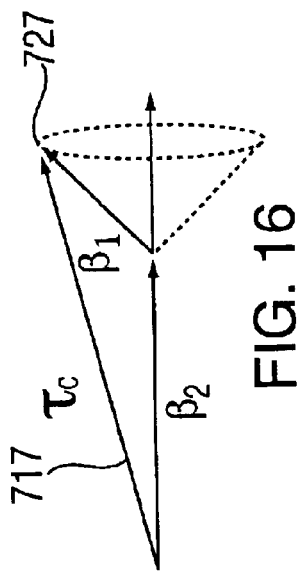
FIG. 16

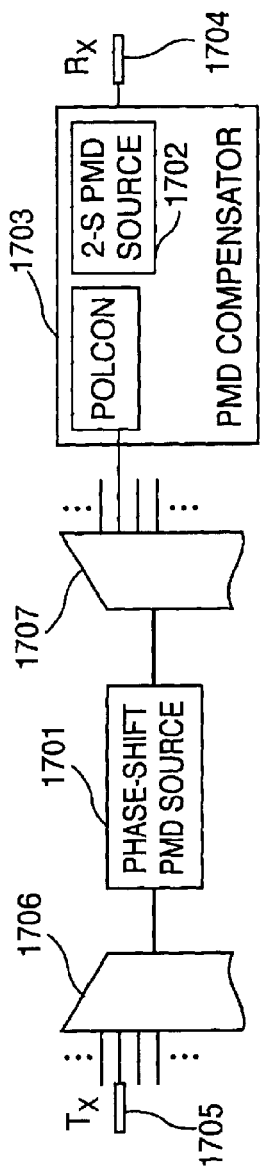
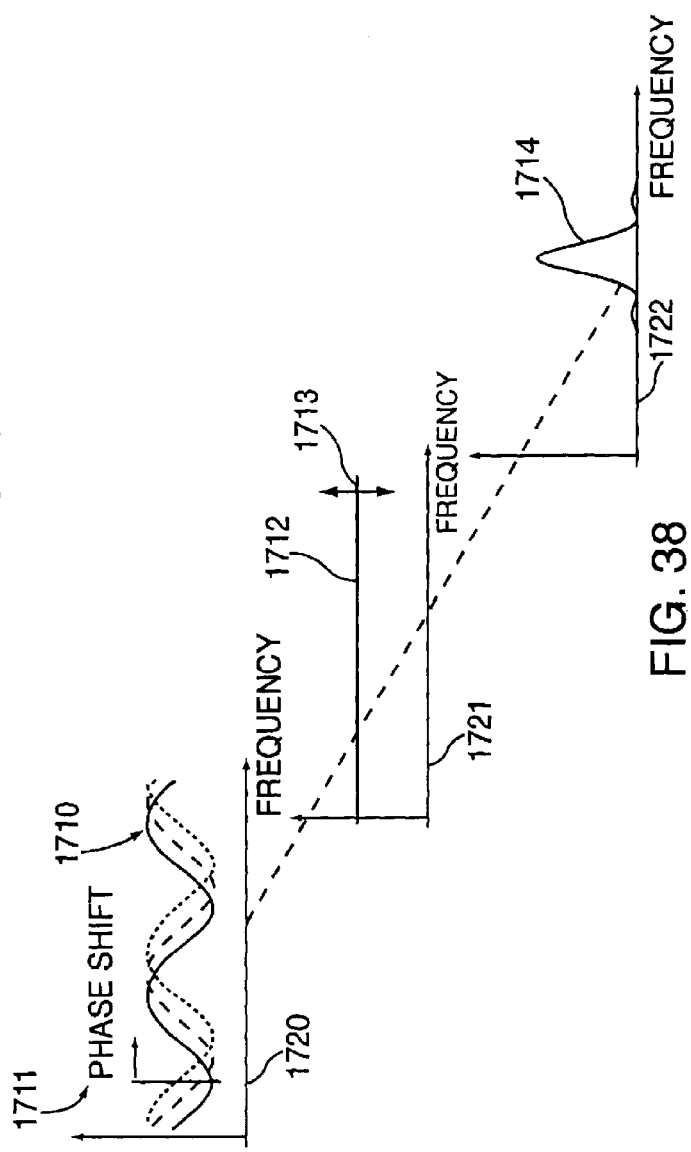
FIG. 37
FIG. 38

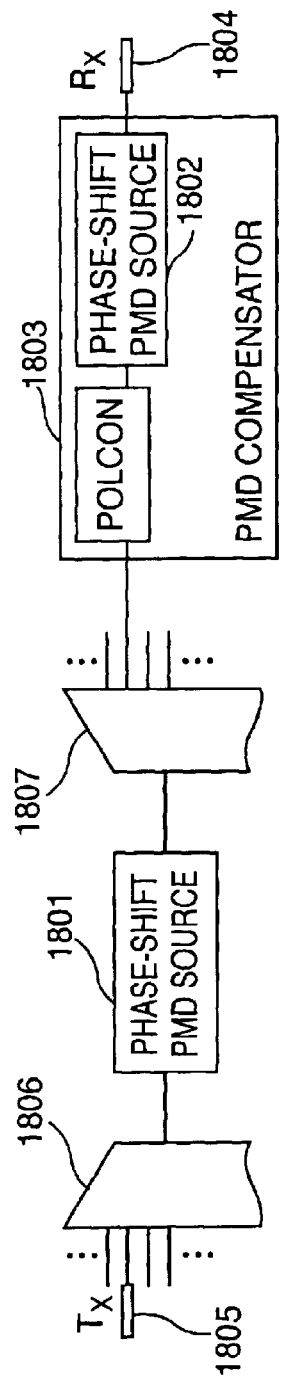
FIG. 39
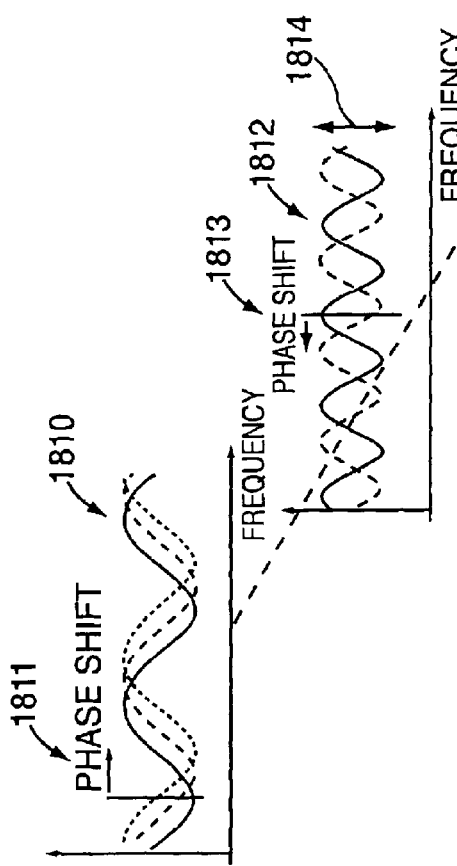
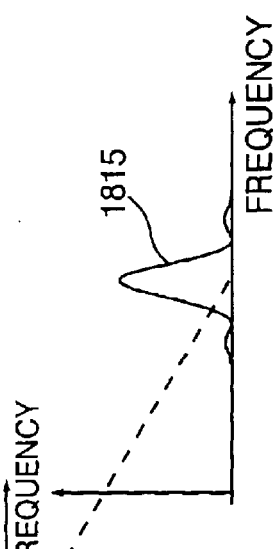
FIG. 40

METHODS AND APPARATUS FOR FREQUENCY SHIFTING POLARIZATION MODE DISPERSION SPECTRA

CROSS-REFERENCE TO RELATED APPLICATIONS

This claims the benefit of U.S. Provisional Patent Application No. 60/251,765, filed Dec. 7, 2000, which is hereby incorporated by reference herein in its entirety.

FIELD OF THE INVENTION

This invention relates to frequency shifting an optical filter's spectra, and more particularly to continuously frequency shifting polarization mode dispersion spectra.

BACKGROUND OF THE INVENTION

Polarization mode dispersion (hereinafter, "PMD") is caused by variations in birefringence along the optical path that causes the orthogonal optical signal polarization modes to propagate at different velocities. The primary cause of PMD is the asymmetry of the fiber-optic strand. Fiber asymmetry may be inherent in the fiber from the manufacturing process, or it may be a result of mechanical stress on the deployed fiber. Environmental changes are dynamic and statistical in nature, and are believed to result in PMD changes that can last for variable periods of time and vary with wavelength, with the potential for prolonged degradation of data transmission.

Optical fiber exhibits PMD because of imperfections within the fiber, which induce localized birefringence. When the transmission path is long, these localized birefringent sections can combine to yield a particularly complicated polarization-dependent effect. These localized sections are known to result, for example, from eccentricities of the waveguide's core, micro-bubbles in the waveguide core and/or cladding, and strain gradients through the fiber cross-section. Mechanical stress on the fiber resulting from cabling and installation can also cause the fiber to suffer stress-induced birefringence.

In the laboratory and the field, there are reasons to artificially generate PMD in a controlled fashion.

In the laboratory, for example, a PMD emulator is desirably used to predictably and repeatably add PMD to signals generated by optical transmitters for testing optical receivers. In many cases, however, the center frequency of the optical signal being tested may not be properly aligned with the PMD spectrum generated by the emulator. Unfortunately, this misalignment reduces the predictability and repeatability of the tests being performed. Because a conventional PMD emulator cannot controllably "frequency shift" its spectrum to accommodate for the misalignment, those attempting to evaluate the PMD response of receivers and other equipment are generally forced to test undesirable and unpredictable PMD states. Often, PMD emulators include ten or more birefringent sections.

A PMD generator can also be incorporated into a specialized telecommunications sub-system called a PMD compensator. PMD compensators are used to mitigate the deleterious effects of PMD imparted on an optical data signal transmitted through an optical fiber. In contrast to PMD emulators, PMD compensators generally include only one or two birefringent sections, but such a small number of sections greatly limits the range of achievable PMD states. In order to achieve a greater operating range, it may be desirable to use PMD compensators that include more than two birefringent generator sections. Unfortunately, PMD spectra generated with more than two sections are difficult to control, subject to misalignment, and are highly frequency dependent.

It is known that polarization "mode-mixing" between adjacent birefringent sections of a PMD generator can be used to control the generated PMD state. For example, adjacent birefringent sections can be (1) optically aligned to maximize PMD, (2) optically crossed to minimize PMD, or (3) optically misaligned to generate some intermediate PMD state.

As mentioned briefly above, when the number of birefringent stages is greater than two, the generated PMD spectrum is generally frequency dependent. In contrast, when the number of birefringent stages is only one or two, the generated PMD spectrum is frequency independent. Although this independence is desirable from an alignment perspective, the limited number of stages provides a limited number of PMD states. Therefore, three or more stages are desirable to achieve a large number of PMD states, but control of devices with three or more stages can be highly unpredictable and susceptible to misalignment.

It would therefore be desirable to provide methods and apparatus to frequency shift a frequency-dependent PMD spectrum.

It would be further desirable to provide methods and apparatus for continuously frequency shifting frequency-dependent PMD spectrum without substantially changing the shape of the spectrum.

SUMMARY OF THE INVENTION

It is therefore the object of the present invention to provide methods and apparatus capable of frequency shifting a frequency-dependent PMD spectrum.

It is also an object of the present invention to provide methods and apparatus to continuously frequency shift a frequency-dependent PMD spectrum without substantially changing the spectrum's shape.

According to one aspect of this invention, a polarization mode dispersion generator for generating a PMD spectrum is provided. The generator includes a plurality of birefringent stages, each stage including a differential group delay element and a phase-shifting element. The generator is capable of inducing an amount of polarization mode-mixing between at least one adjacent pair of said stages. The shape of a PMD spectrum can be substantially preserved while shifting its frequency. Alternatively, the shape of the PMD spectra can be changed with substantially no frequency shifting. PMD compensators and emulators are also taught, as well as methods of using the generator in an optical network.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 11 shows a perspective view of a continuous phase shifter apparatus that can preserves the polarization coordinate system at an output with respect to its input that can be used according to this invention;

FIG. 12A shows an elevational view of the first waveplate of FIG. 11, taken from line 12A—12A of FIG. 9 according to this invention;

FIG. 12B shows an elevational view of the first waveplate of FIG. 11, taken from line 12B—12B of FIG. 9 according to this invention;

FIG. 12C shows an elevational view of the first waveplate of FIG. 11, taken from line 12C—12C of FIG. 9 according to this invention;

FIG. 15 shows a perspective view of concatenated birefringent crystals according to this invention;

FIG. 16 shows three illustrative vector diagrams that can be used to model the construction of a two-stage PMD spectrum according to this invention;

FIG. 37 shows a schematic block diagram of an illustrative architecture for a WDM transmission system that includes an illustrative frequency-shift-enabled PMD generator located between a MUX/DMUX pair, as well as a two stage PMD generator within a compensator, according to this invention;

FIG. 38 illustrates the relationship between a PMD spectra generated by PMD generators of FIG. 37 and a channel spectrum generated by a transmitter of FIG. 37, according to this invention;

FIG. 39 shows a schematic block diagram of an illustrative architecture for a WDM transmission system that includes illustrative frequency-shift-enabled PMD generators, one of which is located between a MUX/DMUX pair according to this invention;

FIG. 40 illustrates the relationship between a PMD spectra generated by PMD generators of FIG. 39 and a channel spectrum generated by a transmitter of FIG. 39, according to this invention;

DETAILED DESCRIPTION OF THE INVENTION

PMD is an optical property that can be generated by a concatenation of two or more birefringent elements in succession. To frequency shift a PMD spectrum without changing its shape, optical retardation of each of the birefringent elements should be changed in coordination. The amount of optical retardation change required for a birefringent element is determined by the differential group delay of the element. Accordingly, the optical retardation change for each birefringent element can be different or can be the same. In either case, coordinated control of optical retardation can be used to frequency shift a PMD spectrum without changing its shape.

Figure 1:
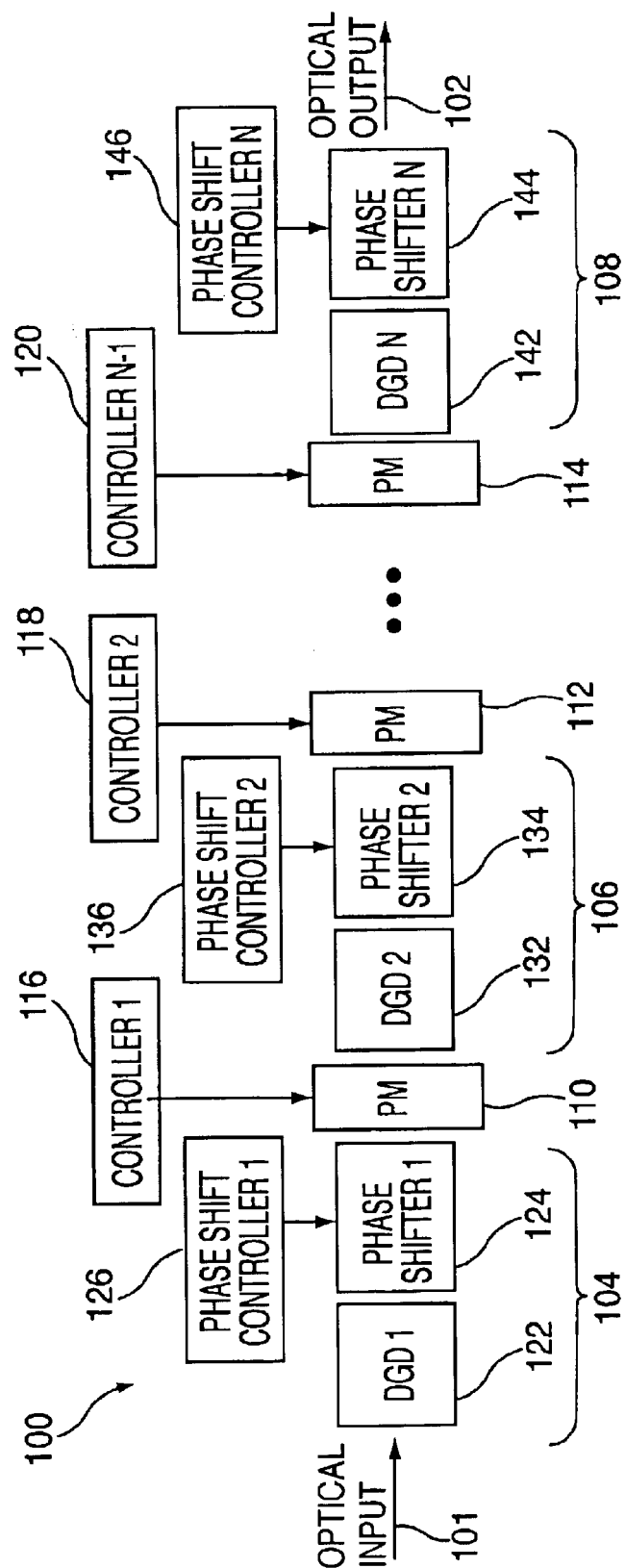
FIG. 1 shows a schematic block diagram of illustrative PMD generator and phase shifter apparatus according to this invention.

FIG. 1 shows illustrative PMD generator and phase shifter apparatus 100. Input optical beam 101 propagates through all optical elements of apparatus 100 to generate output optical beam 102 having a certain amount of PMD. Each of birefringent stages 104, 106, . . . , and 108 is capable of generating an amount of differential group delay (hereinafter, "DGD") generators and phase shift elements.

Polarization mode mixing elements 110, 112, . . . , and 114 are located between each pair of adjacent birefringent stages. These elements can be used to control the resultant PMD spectrum generated at output 102. In particular: element 110 is between birefringent stages 104 and 106; element 112 is between birefringent stage 106 and another intermediate birefringent stage (not shown); and element 114 is between a subsequent birefringent stage (not shown) and birefringent stage 108. Elements 110, 112, . . . , 114 are controlled by controllers 116, 118, and 120, respectively. Generally, there is one less mode-mixing element than there are birefringent stages.

Each birefringent stage includes a DGD element, which can be any birefringent element capable of generating DGD, and a phase shifting element, which can tune the degree of optical retardation present at the output of the DGD element and phase shifting element pair. For example, birefringent stage 104 includes DGD element 122 and phase shifting element 124. Phase shift controller 126 controls phase shifting element 124. Similarly, birefringent stage 106 includes DGD element 132 and phase shifting element 134. Phase shift controller 136 controls phase shifter 134. Finally, birefringent stage 108 includes DGD element 142 and phase shifter element 144, where phase shift controller 146 controls phase shifting element 144.

PMD generator 100 can be operated in at least two modes. In a first mode, the shape of a PMD spectrum can be changed (i.e., the PMD state can be set) by adjusting the degree of polarization mode mixing induced by polarization mode mixing elements 110, 112, and 114, which are controlled by controllers 116, 118, and 120, respectively. In this case, as the degree of mixing changes from stage to subsequent stage, and the shape of the resultant PMD spectrum at output 102 can change.

The second mode involves the coordinated change of all the phase shifting elements of generator 100. In this mode, phase shift controllers 126, 136, and 146 determine the degree of phase shift for each birefringent stage. As the phase shift is changed, the PMD spectrum at output 102 can be frequency shifted to higher or lower frequencies while substantially retaining its shape. Again, in contrast to the first PMD setting mode, this phase shifting mode requires the coordinated control of shifting elements 124, 134, . . . , 144. Furthermore, it will be appreciated that either mode can be used without using the other. Alternatively, both modes can be used in conjunction.

Figure 2:
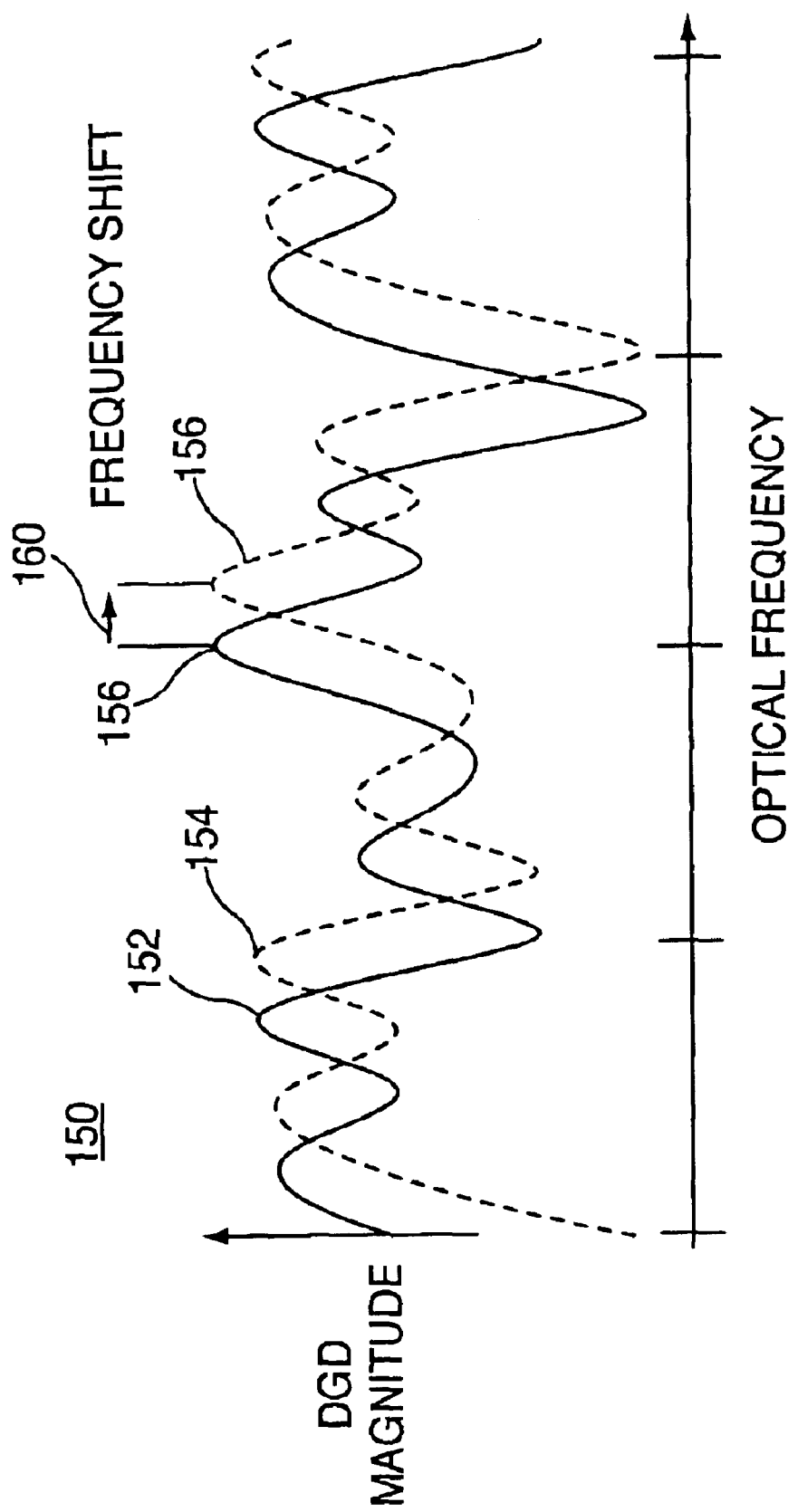
FIG. 2 shows an illustrative generated DGD spectrum at the output of the generator shown of FIG. 1 according to this invention.

FIG. 2 shows illustrative generated DGD spectrum 150 at output 102. In this case, each of mixing elements 110, 112, . . . , 114 of generator 100 is oriented in such a way as to generate desired DGD spectrum 152. DGD spectrum 152, for example, has a particular shape and can be periodic. As used herein, a periodic spectrum is one that repeats its shape at regular frequency intervals. Also, the frequency separation between adjacent repeats is called the period. As shown in FIG. 2, spectra 152 and 154 have the same shape and are periodic, but point 158, for example, of spectrum 154 occurs at a higher frequency than respective point 154 of spectrum 152. Thus, spectrum 154 is essentially shifted upward by a frequency amount 160 from spectrum 152. Accordingly, when a PMD generator according to this invention is operated in the frequency-shifting mode, it can substantially preserve the shape of a PMD spectrum while frequency shifting it. As explained below in more detail, this can be accomplished by properly tuning the residual optical retardation of each birefringent stage.

There are at least two methods for tuning the optical retardation of a birefringent element. The first method involves the direct addition or subtraction of optical retardation using an electro-optic element that leads, or follows, a birefringent element. The second method involves the use of an optical phase shifter (Evans, "The Birefringent Filter," *J. Optical Soc. of America*, Vol. 39, No. 3, at 229–242 (March, 1939)) (hereinafter, "Evans") in optical alignment with a birefringent element. Both methods are described below.

A birefringent dielectric medium is an optically transparent medium that exhibits more than one index of refraction. Common birefringent dielectric media are birefringent crystals, such as yttrium ortho-vanadate ($YVO_4$), rutile, lithium niobate ($LiNbO_3$), and crystalline quartz. As used herein, a birefringent crystal is considered a high-birefringent crystal when the birefringence of the crystal is relatively higher than another birefringent crystal. Nonetheless, some birefringent crystals are commonly referred to as high-birefringent crystals, including $YVO_4$ and rutile. In contrast, mica and crystalline quartz are commonly referred to as low-birefringent crystals, even though they are not explicitly compared to another medium.

Figure 3:
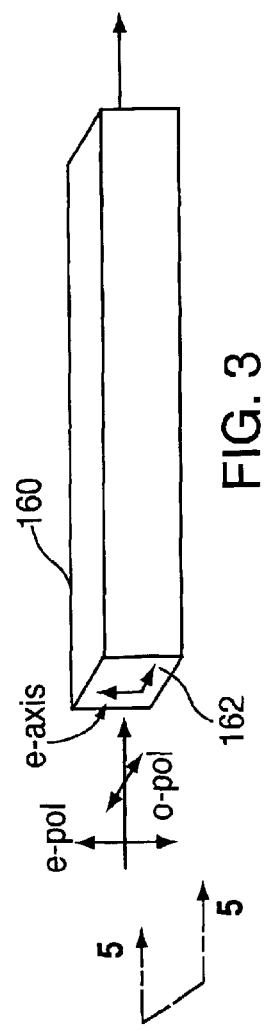
FIG. 3 shows a perspective view of an illustrative uniaxial birefringent crystal cut as a parallelepiped with its extraordinary axis shown at its face according to this invention.
Figure 5:
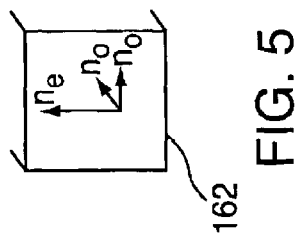
FIG. 5 shows a perspective view of a face of the birefringent crystal of FIG. 3, showing three mutually orthogonal crystalline axes internal to the crystal according to this invention.

FIG. 3 shows illustrative uniaxial birefringent crystal 160 cut as a parallelepiped with its extraordinary axis shown at face 162 of the input. As with any uniaxial birefringent crystal, crystal 160 can be characterized by two "ordinary" refractive indices and one "extraordinary" refractive index. Each index lies along one of three mutually orthogonal crystalline axes internal to the crystal, as illustrated by the perspective view of crystal face 162 in FIG. 5. A positive uniaxial crystal exhibits an extraordinary refractive index greater than the ordinary refractive index, while a negative uniaxial crystal exhibits an extraordinary refractive index less than the ordinary refractive index. The birefringence of a uniaxial crystal, as used herein, refers to the difference in refractive indices between the extraordinary and ordinary indices. The birefringence of a biaxial crystal can be defined in a similar fashion.

Within any dielectric medium, the wavelength of an optical beam is shortened from the corresponding free-space wavelength by the value of the refractive index that the beam experiences. The refractive index that the beam experiences depends, at least partially, on the polarization state of the beam. If the polarization state has a component that is aligned with the extraordinary axis of the crystal, that component experiences the extraordinary refractive index. It will be appreciated that the same rule applies for polarization components aligned with an ordinary axis.

It will be appreciated that the velocity of an optical beam depends on the refractive index that the beam experiences. Because of this dependence, there are two distinct velocities possible within a uniaxial birefringent material. Thus, a polarization component that is aligned with the extraordinary axis travels at a different velocity from a polarization component aligned with one of the ordinary axes. In general, a beam having an arbitrary polarization state that enters a uniaxial birefringent medium is, in general, resolved into two distinct beams, each having a linear orthogonal polarization state. The linear states are aligned with the internal crystalline axes and each beam has distinct velocities.

For example, if a uniaxial birefringent crystal has ordinary and extraordinary refractive indices of 2.0 and 2.2, respectively, such a crystal is a positive uniaxial crystal. The wavelength of an optical beam having its polarization state aligned with one of the ordinary axes of the crystal is shortened within the crystal by a factor of 2.0 when compared to the wavelength of the optical beam traveling in free space. The wavelength for another beam having its polarization state aligned with the extraordinary axis of this crystal is shortened by a factor of 2.2 when compared to the beam wavelength in free space.

Figure 4:
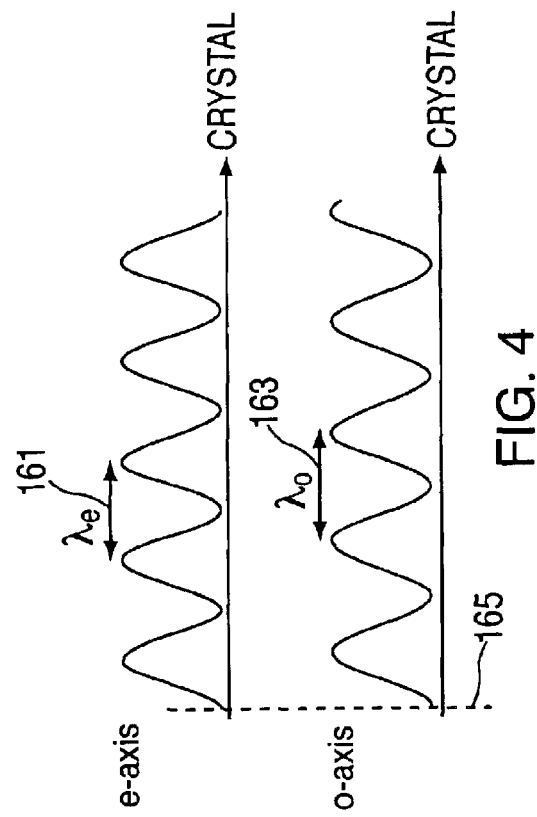
FIG. 4 shows two illustrative beams having wavelengths within the birefringent crystal shown in FIG. 3 according to this invention.

FIG. 4 illustrates two beams having wavelengths 161 and 163 within crystal 160. One beam has wavelength 161 and has its polarization component aligned along the extraordinary crystalline axis. The other beam, having longer wavelength 163, has its polarization component aligned along one of the ordinary axes. At input plane 165, which corresponds to face 162, the two beams can start at the same position, but because wavelengths 561 and 563 differ, the separation between a peak on one axis and a peak on the other axis increases during transit through crystal 560. Because any one optical wavelength peak is indistinguishable from another, the wave on one axis effectively propagates in and out of phase with the wave on the other axis.

Thus, optical retardation, sometimes referred to simply as retardation, is a measure of phase "slip" between two polarization component beams. When two orthogonally polarized beams are in phase, the retardation is zero. When the same beams slip by one full wave, the retardation is $2\pi$. Similarly, when the same beams slip by two full waves, the retardation is $4\pi$. Retardation value can be referred to in modulo ($2\pi$). Thus, any integral number of wave slips corresponds to zero retardation.

Optical retardation is thus better used as a measure of the fractional slip in phase between two component optical beams. For example, a half-wave phase slip corresponds to a retardation of $\pi$.

Another metric of birefringence is the birefringent beat length, which is the physical length corresponding to a retardation of $2\pi$. The birefringent beat length is the free-space optical wavelength at a given optical frequency divided by the birefringence of the crystal. Thus, according to the preceding example, if the birefringence of a crystal is 2.2−2.0=0.2 and the free-space wavelength is 1.5 microns, the birefringent beat length is 1.5/0.2 microns, or 7.5 microns.

Figure 6:
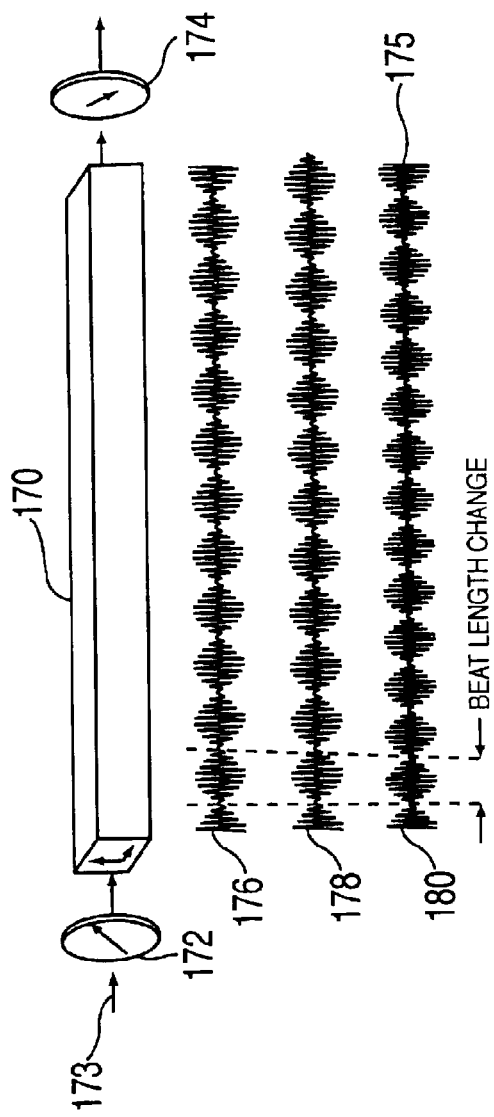
FIG. 6 shows a perspective view of another illustrative birefringent crystal located between two crossed polarizers according to this invention.

FIG. 6 shows birefringent crystal 170 located between two crossed polarizers 172 and 174. In this case, input optical beam 173 is linearly polarized by polarizer 172, continues to propagate through birefringent crystal 170, and is analyzed by crossed polarizer 174. FIG. 6 also shows corresponding beat patterns 176, 178, and 180, each of which illustrates the beat between orthogonal polarization components of an optical beam through crystal 170. The beat lengths of beat patterns 176, 178, and 180 correspond to the birefringent beat lengths at three different optical frequencies. It will be appreciated that the optical intensity does not periodically vary through the crystal and beat patterns 176, 178, and 180 are merely provided for illustrative purposes.

Beat patterns 176, 178, and 180 show that an integral number of birefringent beats can exist in a birefringent crystal, but there can, in some cases, be some residual retardation. That is, some fraction of a birefringent beat can still remain at the end of crystal 170. The residual retardation corresponds to the optical retardation that remains after the integral number of birefringent beats is subtracted. Also, as the optical frequency of the beam increases, the wavelength decreases, providing for a higher number of beats within crystal 570.

Figure 7:
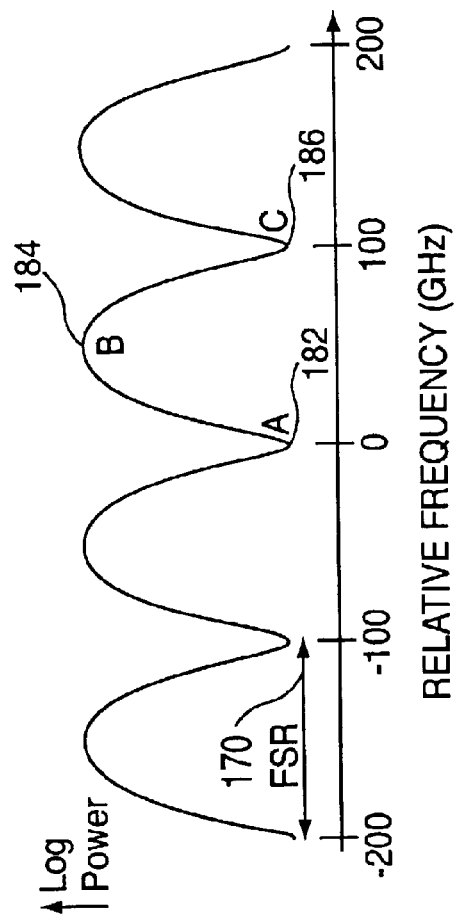
FIG. 7 shows the relationship between intensity and frequency at the output analyzer shown in FIG. 6 according to this invention.

FIG. 7 shows how the optical intensity varies through analyzer 174 as a function of optical frequency. When the beat pattern at crystal termination 175 is maximized in the output plane, such as in the case of trace 176, intensity 182 through polarizer 174 is minimized. Similarly, intensity 184 is maximized at termination 173 when the beat terminates at a minimum, such as in trace 178.

A further increase of the optical frequency can restore the maximized beat pattern and corresponding minimized transmitted intensity 186, such as the one shown in trace 180, albeit with an additional beat along the crystal length. Thus, FIG. 7 shows that as the optical frequency changes, an optical intensity through analyzer 174 essentially generates a periodic waveform. The frequency separation between points 182 and 186 is the free spectral range (hereinafter, "FSR") of crystal 170.

As an example, the birefringence of a YVO$_4$ crystal at 1.55 microns is approximately 0.214. The beat length is therefore 1.55/0.214~7.25 microns. A YVO$_4$ crystal that is 14.022 mm long generates an FSR of about 100 GHz—a convenient telecommunications value. Thus, within this crystal there are approximately 1935 birefringent beat lengths from input face to output face.

When an electric field is applied to an electro-optic dielectric medium, the medium exhibits a birefringence. The principal axis of the medium is the direction of the electrically induced birefringence. Commonly, electro-optic dielectric media are also birefringent crystals (e.g., LiNbO$_3$). A birefringent crystal has an inherent birefringence. LiNbO$_3$ is an example of a negative uniaxial birefringent crystal having an extraordinary axis and two ordinary axes, all of which are mutually orthogonal. The principal axis is used to designate a birefringent axis that can be different in pointing direction to either the extraordinary or ordinary axes. When an electric field is applied, an electro-optic crystal can possess both an extraordinary axis and a principal axis, and the axes need not be parallel nor perpendicular with one another.

Figure 8:
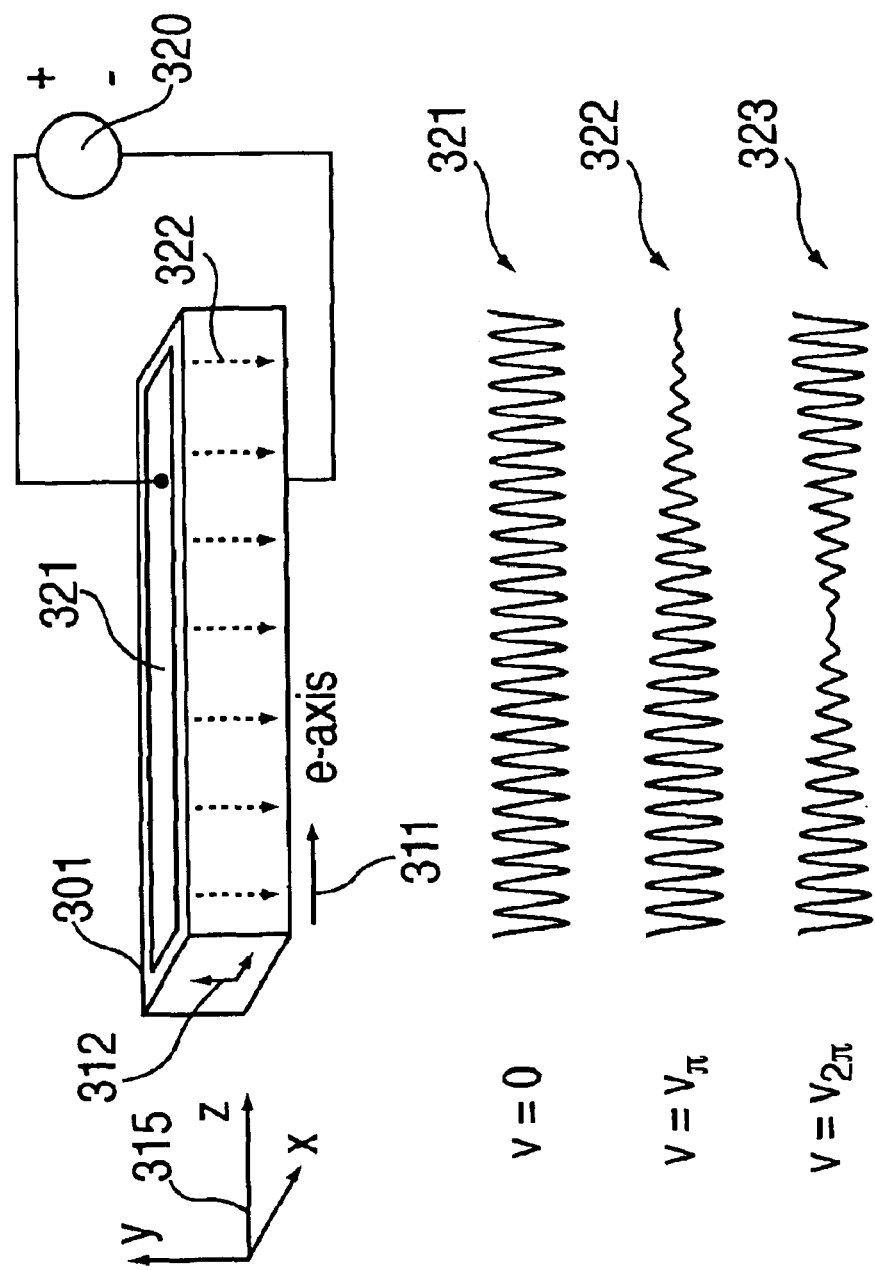
FIG. 8 shows a perspective view of an illustrative uniaxial birefringent electro-optic crystal cut as a parallelepiped and three retardation states of the same crystal according to this invention.

FIG. 8 shows illustrative uniaxial birefringent electro-optic crystal 301 cut as a parallelepiped. Extraordinary axis 311 of crystal 301 is directed along propagation axis 315 of crystal 301. Accordingly, ordinary axes 312, which are orthogonal to axis 311, yield zero inherent birefringence. Voltage source 320 can be used to apply a potential difference between top metal contact 321 and bottom metal contact (not shown). The potential difference induces electric field 322, which, in the case of crystal 301, is directed downward. For example, if the crystal used to fabricate the electro-optic crystal were lithium niobate (cut and oriented as shown in FIG. 8), the principal axis would point parallel to electric field 322.

When voltage source 320 induces electric field 322 in crystal 301, an electro-optically induced birefringence results. In other words, two distinct refractive indices are present in the crystal, which in turn induces a certain amount of optical retardation in optical beam propagating in the crystal.

Generally, the voltages required for 0, π, and 2π retardation (i.e., $V_0$, $V_\pi$, and $V_{2\pi}$) are of interest, which correspond to retardation states 321, 322, and 323. Zero retardation state 321 shows no phase slip between orthogonal polarization components; retardation state 322 shows a 180 degree (i.e., π phase slip between components; and retardation state 323 shows a 360 degree (i.e., 2π) phase slip. Lithium niobate, for example, is a linear electro-optic material in which the magnitude of the optical retardation scales linearly with the voltage applied to the crystal.

Figure 9:
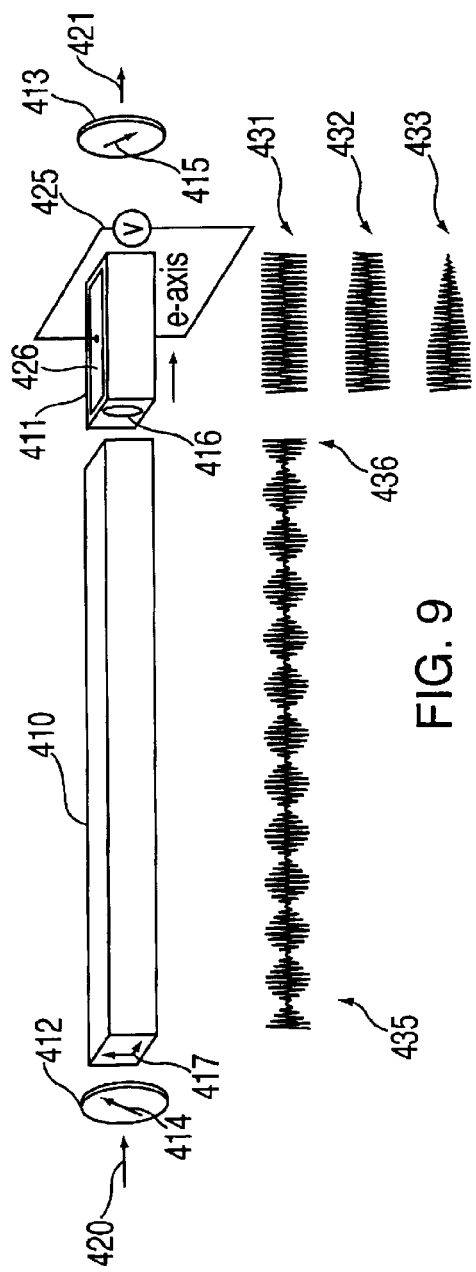
FIG. 9 shows a perspective view of an illustrative PMD generator including a birefringent crystal and an electro-optic crystal located between crossed polarizers, as well as a number of associated beat patterns according to this invention.

FIG. 9 shows an illustrative one-stage PMD generator, including birefringent crystal 410 and electro-optic crystal 411, located between crossed polarizers 412 and 413. In this embodiment, polarizing axes 414 and 415 of crossed polarizers 412 and 413 are substantially perpendicular to each other. Extraordinary axis 417 of birefringent crystal 410 and principal axis 416 of electro-optic crystal 411 can be substantially parallel or perpendicular, which minimizes polarization mode mixing between the crystals.

The electro-optically induced birefringence of crystal 411 corresponds to voltage 425 when voltage 425 is applied to top and bottom metal pads 426. Beat pattern 435 illustrates the beating that occurs between orthogonal polarization components of an optical beam through crystal 410. The termination of the beat pattern at end plane 436 shows a maximum. This maximum is then provided to crystal 411.

Three additional beat patterns corresponding to three different applied voltages are also shown in FIG. 9: pattern 431 corresponds to a zero applied voltage; pattern 432 corresponds to an applied voltage used to induce a quarter-wave of optical retardation; and pattern 433 corresponds to an applied voltage used to induce a half-wave of optical retardation. It will be appreciated that as the optical retardation is increased, the birefringent beat repeatedly transitions from maxima to minima.

Figure 10:
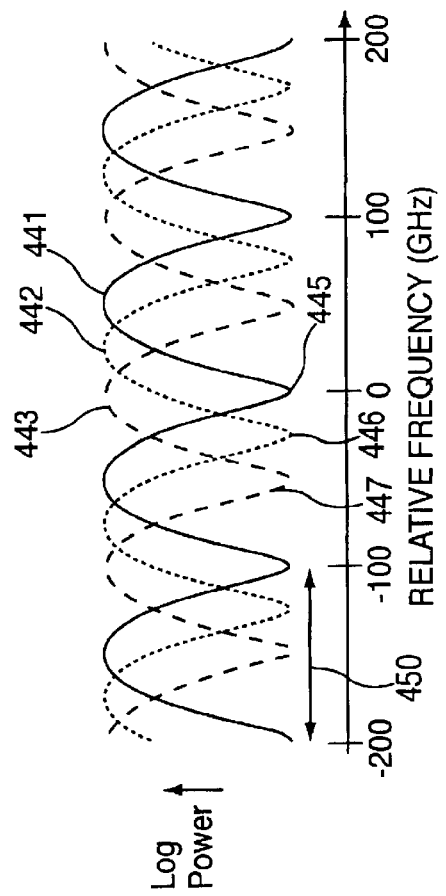
FIG. 10 shows three different frequency dependent intensity spectra that correspond to three beat patterns shown in FIG. 9 according to this invention.

FIG. 10 shows three different intensity spectra 441, 442, and 443 that correspond to beat patterns 431, 432, and 433, respectively. Each spectrum is periodic and has the same free-spectral range 450. It will be appreciated, however, that the position of any particular spectral minima shifts as the applied voltage is varied. For example, minimum 445 of spectrum 441, minimum 446 of spectrum 442, and minimum 447 of spectrum 443, all represent the same relative minimum, although frequency shifted with respect to one another.

The frequency difference between frequencies 446 and 445, and between frequencies 447 and 445, correspond to frequency offsets that result from voltages applied to electro-optic crystal 411. The frequency offsets of spectra 442 and 443 can further be translated into phase offsets (i.e., phase shifts) by normalizing the frequency offset to the free-spectral range. That is, the phase shift of spectra 442 and 443 with respect to 441 is the corresponding frequency offset divided by free-spectral range 450 multiplied by 2π. It will be appreciated that the shape of intensity spectra 441, 442, and 443 remains substantially intact while the spectra are phase shifted in frequency. Because the spectra are periodic, there is no distinction between a phase shift of 2nπ, where n is an integer.

FIG. 11 shows a perspective view of continuous phase shifter apparatus 500 that preserves the polarization coordinate system at output 503 with respect to input 501 (see, Evans). Quarter-wave waveplates 504 and 506 have respective birefringent axes 507 and 509 rotated by +45 degrees with respect to coordinate system 502. When birefringent axis 508 of center half-wave waveplate 505 is rotated to −45 degrees with respect to the x-axis of coordinate system 502, the apparatus has essentially no polarization effect.

FIGS. 12A, 12B, and 12C show the relative orientations of birefringent axes 507, 508, and 509 of waveplates 504, 505, and 506, respectively. Here, the orientations of waveplates 504 and 506 are fixed while center waveplate 505 is rotated through angle ρ about the longitudinal axis of apparatus 500.

The effect on output optical beam 501 as center waveplate 505 is mechanically rotated is to continuously tune the output polarization state along a circle in Stokes space, where the normal to the circle in Stokes space lies along the polarization state parallel to the physical horizontal axis 510. In other words, apparatus 500 phase slips one polarization component with respect to the other, thus controllably accruing optical retardation.

It will be appreciated that PMD spectral phase shifting can be achieved by varying the amount of optical retardation provided by the phase shifting elements, PMD spectral shape can also be achieved by varying the amount of mode-mixing between stages.

Figure 13:
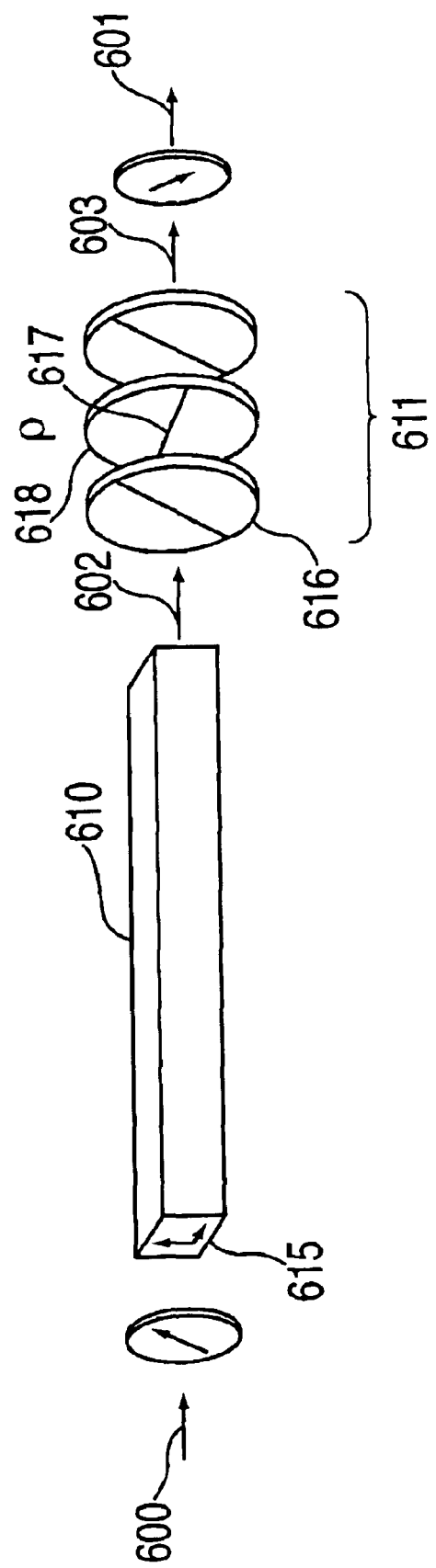
FIG. 13 shows a perspective view of another illustrative phase shifter in optical alignment with birefringent crystal according to this invention.

FIG. 13 shows illustrative phase shifter 611 (see, Evans) in optical alignment with birefringent crystal 610. In this case, birefringent axes 615 of crystal 610 lie along the horizontal and vertical, and birefringent axis 616 of the lead waveplate is aligned at a relative angle of 45 degrees. The relative birefringent axis orientations of waveplates within the phase shifter are those shown in FIGS. 12.

Birefringent axes 615 of crystal 610 determine two orthogonal polarization components that experience relative phase slip during propagation through the crystal. Given the relative orientation of the birefringent axes 615 and axis 616 of the phase shifter, the polarization components along optical beam 602 are the same components that are phase shifted through the phase shifter. Optical beam 603 can therefore experience added or subtracted optical retardation with respect to optical beam 602.

Figure 14:
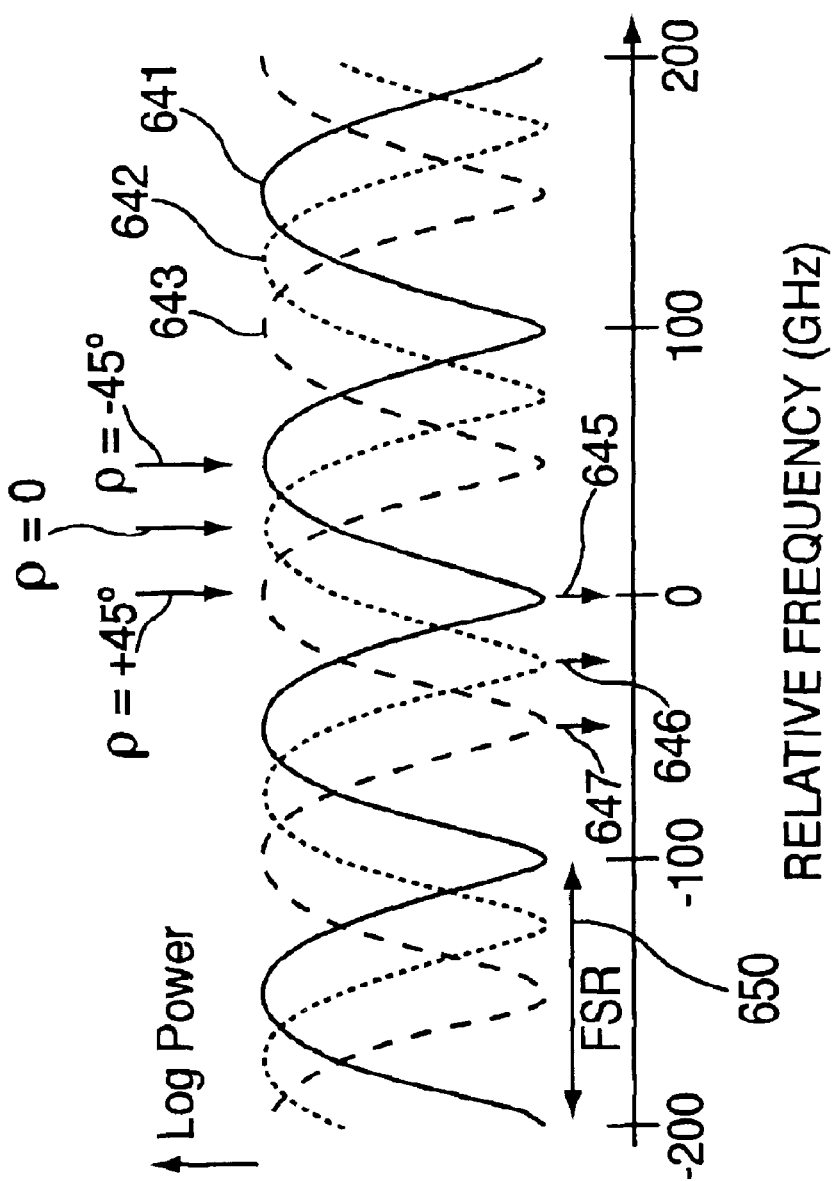
FIG. 14 shows three illustrative intensity spectra of the output beam of the apparatus shown in FIG. 13 according to this invention.

FIG. 14 shows three illustrative intensity spectra of output beam 601, which are similar to those shown in FIG. 10. Each spectrum corresponds to a rotation of birefringent axis 617 of half-wave waveplate 618: spectrum 641 corresponds to a zero-wave of optical retardation generated by phase shifter 611, spectrum 442 corresponds to a quarter-wave of optical retardation generated by phase shifter 611, and spectrum 443 corresponds to a half-wave of optical retardation generated by phase shifter 611.

Although all spectra 641, 642, and 643 are periodic with the same free spectral range, the spectra shifts with frequency as waveplate 618 is rotated. As shown, phase shifter 611 can phase shift optical intensity spectra 641, 642, and 643, while substantially preserving the shape of the spectrum. In another context, a demonstration of this effect was reported in Bührer U.S. Pat. No. 4,987,567 (hereinafter, "Bührer").

It will be appreciated that the birefringent filters discussed by Evans and Bührer address the production and phase shift of optical intensity spectra. Evans utilized input and output polarizers to generate intensity variation as a function of frequency. Bührer used polarization diversity to generate two beams without having the polarizer block light. Inspection of either beam in the absence of the other revealed an optical intensity spectrum.

In contrast, the present invention is directed to the production and phase shifting, or more generally frequency shifting, of optical PMD spectra. Generation of optical PMD spectra requires substantially no polarization dependent loss. Therefore, the use of polarizers and/or polarization diversity schemes is not applicable. Rather, the present invention teaches methods and apparatus that generate periodic frequency-dependent PMD spectra that can further be continuously phase shifted in frequency while the shape of the PMD spectra remains substantially intact.

In general, PMD spectra only exhibit structure when more than two birefringent elements are concatenated. FIG. 15 shows concatenated birefringent crystals 700 and 701. Respective birefringent axes 702 and 703 can be rotated such that they are neither parallel nor perpendicular such that polarization mode mixing occurs from the first crystal to the second. Polarization mode mixing can occur in a concatenation of two or more birefringent crystals when the birefringent axes are not aligned. Polarization mode mixing does, however, occur when the amplitude and phase of two polarization components generated by a first crystal are altered upon entrance into a second crystal. Transmission of input optical beam 705 through crystals 700 and 701 imparts PMD onto output optical beam 706.

Gordon and Kogelnik show how to geometrically construct a resultant PMD spectrum from a concatenation of birefringent elements (see, Gordon et al. "PMD Fundamentals: Polarization mode dispersion in optical fibers," *Proceedings of the National Academy of Sciences*, Vol. 97, No. 9, at 4541–4550 (Apr. 25, 2000)) (hereinafter, "Gordon et al."). FIG. 16 shows three vector diagrams that can be used to model the construction of a two-stage PMD spectrum according to rules shown by Gordon et al. Birefringent vectors 710 and 711, respectively, and resultant PMD vector 715 exist in a three dimensional space. The lengths of vectors 710 and 711 correspond to the inverse of the free-spectral ranges of crystals 700 and 701, respectively. Angle 714 (between vectors 710 and 711) is determined by the relative angle between birefringent axes 702 and 703. The base of birefringent vector 710 is attached to the tip of birefringent vector 711. Axis 713 is an extension of birefringent vector 711. Although the base of birefringent vector 710 remains fixed in space, birefringent vector 710 precesses about axis 713 to trace a circle 712 when the optical frequency of input optical beam 705 monotonically changes. The rate of precession, that is the change of precession angle with change of frequency, is related to the length of birefringent vector 711.

Each of the three vector diagrams of FIG. 16 corresponds to three different optical frequencies. At a first frequency, the tip of birefringent vector 710 points at position 725. At second and third frequencies, the tip of birefringent vector 710 points at positions 726 and 727, respectively.

Thus, PMD vectors 715, 716, and 717 are the vector sums of birefringent vectors 710 and 711 of crystals 700 and 701 at three different frequencies. The length of any of these vectors corresponds to the differential group delay (hereinafter, "DGD") at that frequency. The pointing direction of each of these vectors corresponds to one of two orthogonal principal states of polarization (hereinafter, "PSP") at that frequency. Together, DGD and PSP represent PMD at any frequency. As birefringent vector 710 precesses about axis 713 with frequency, the pointing direction of PMD vector 715 changes accordingly, but the length of vector 715 remains fixed.

Figure 17:
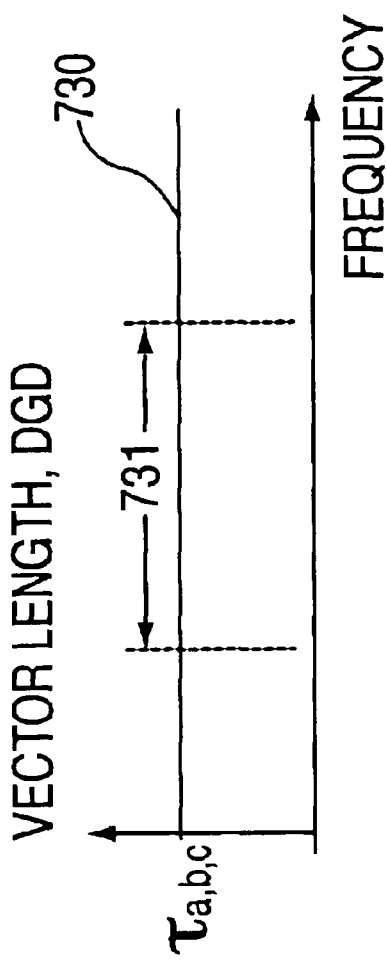
FIG. 17 shows the frequency independence of a DGD spectrum generated by two birefringent sections shown in FIG. 16 according to this invention.

FIG. 17 illustrates the frequency independent DGD generated by two birefringent sections. Since the PMD vector length remains fixed, DGD spectrum 730 is constant in frequency. FSR can be defined from the PSP spectrum, but FSR 731 is not apparent in DGD spectrum 730.

Figure 18:
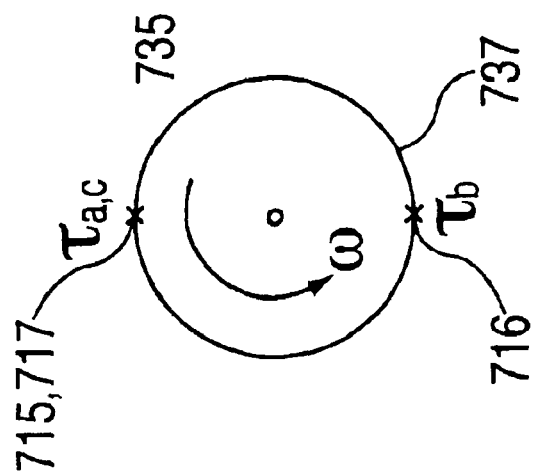
FIG. 18 shows a PSP spectrum corresponding to the vector diagrams of FIG. 16 in which the tip of a birefringent vector traces a circle in frequency according to this invention.

FIG. 18 shows an axial view of PSP spectrum 735, which resides on the surface of the Poincaré sphere. The tip of birefringent vector 710 traces a circle in frequency, so that the tip of vector 710 points in direction 736 at one frequency, direction 737 at another frequency, and again at direction 736 at another frequency. Since the tip can point in direction 736 for two different frequencies, a free-spectra-range can be defined as the minimum frequency difference for when the birefringent vector 710 tip points in the same direction.

Figure 19:
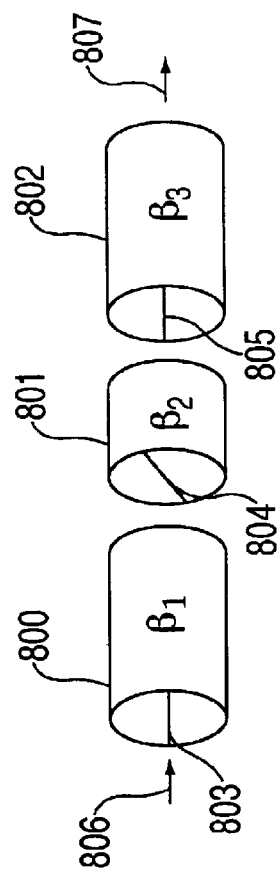
FIG. 19 shows a perspective view of an illustrative concatenation of three birefringent crystals with respective birefringent axes that are rotated such that no two adjacent orientations are either parallel or perpendicular according to this invention.

FIG. 19 shows illustrative birefringent 800, 801, and 802 with respective birefringent axes 803, 804, and 805 that are rotated such that no two adjacent orientations are either parallel or perpendicular. In this case, polarization mode mixing occurs from the first crystal to the second, and from the second to the third.

Figure 20:
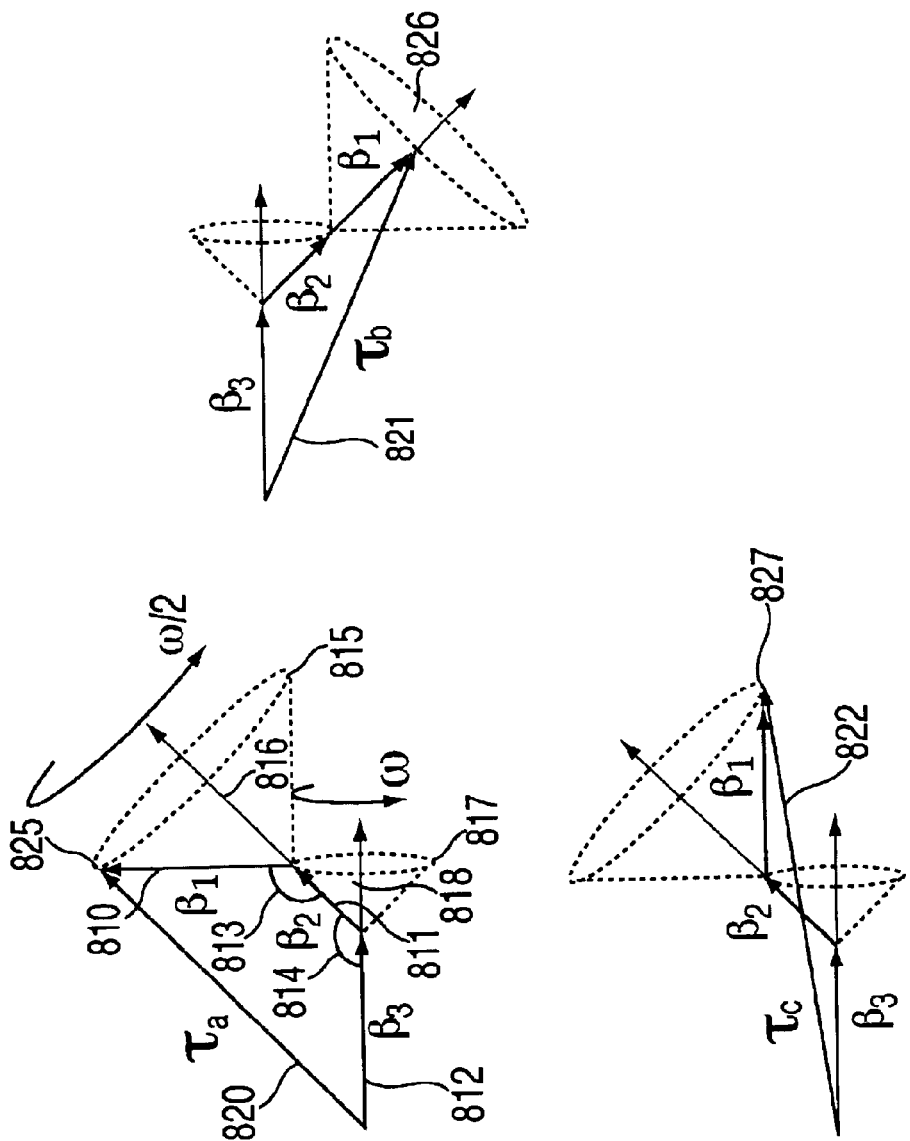
FIG. 20 shows three illustrative vector diagrams that can be used to model the construction of a three-stage PMD spectrum according to this invention.

FIG. 20 shows three illustrative vector diagrams that can be used to construct a three-stage PMD spectrum according to the rules provided by Gorgon. Birefringent vectors 810, 811, and 812, correspond to birefringent crystals 800, 801, and 802, respectively. The lengths of the birefringent vectors correspond to the inverses of the free-spectral range of the associated crystals. As an example, we assume that crystal 802 has a FSR that is one-half that of crystal 801. FIG. 20A shows angles 813 and 814, which correspond to the relative angles between birefringent axes 803 and 804, and axes 804 and 805, respectively.

FIG. 20A shows the motion of vectors 810, 811, and 812 with respect to frequency. Vector 810 precesses about axis 816, which is an extension of vector 811, to trace circle 815. Likewise, vector 811 precesses about axis 818, which is an extension of vector 812, to trace circle 817. For this example, the precession rate of vector 810 about 811 is one-half that of the precession rate of vector 811 about 812.

PMD vectors 820, 821, and 822 are the vector sums of birefringent vectors 810, 811, and 812 at three different frequencies for crystal 800, 801, and 802. Unlike the case illustrated by FIG. 17, the length of vector 820 (i.e., DGD) changes with frequency. Also, it will be appreciated that the motion of the pointing direction traces a contour more complicated than a circle.

Figure 22:
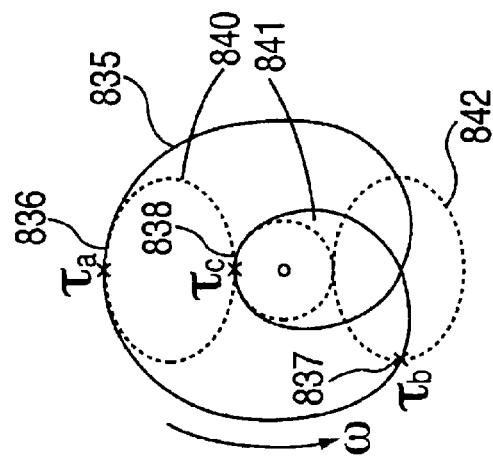
FIG. 22 shows a PSP spectrum corresponding to the vector diagrams of FIG. 20 in which the tip of certain birefringent vectors trace various shapes in frequency according to this invention.
Figure 21:
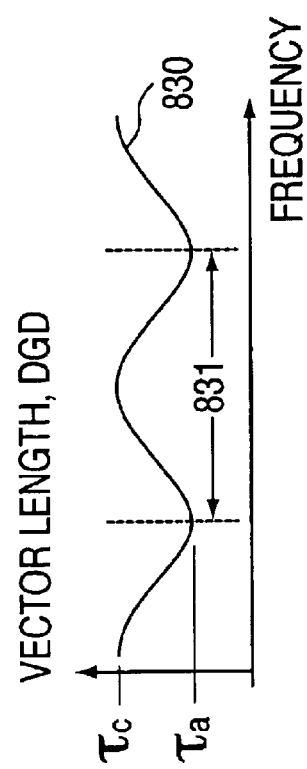
FIG. 21 shows an illustrative DGD spectrum corresponding to the concatenation of three birefringent crystals shown in FIG. 19 according to this invention.

FIG. 21 illustrates DGD spectrum 830 as a function of frequency. Free-spectral-range 831 is now apparent. FIG. 22 shows PSP spectrum 835. Contour 835 traces the pointing direction of PMD vector 820 as a function of frequency. Elemental precession circle 841 corresponds to precession circle 817 of FIG. 20. Elemental precession circles 840 and 842 correspond to precession circle 815 as rotated about precession circle 817 at two different frequencies. Elemental circles 840, 841, and 842 represent the outer and inner boundaries of PSP contour 835. Pointing direction 836 corresponds to the minimum DGD while pointing direction 838 corresponds to the maximum DGD.

It will be appreciated that the addition of birefringent elements located in concatenation with the three elements illustrated in FIG. 8A further adds structure to the PMD spectrum. As more elements are added, more birefringent vectors are necessary to represent the resultant PMD vector, and in turn, more precession contours are traced.

Figure 23:
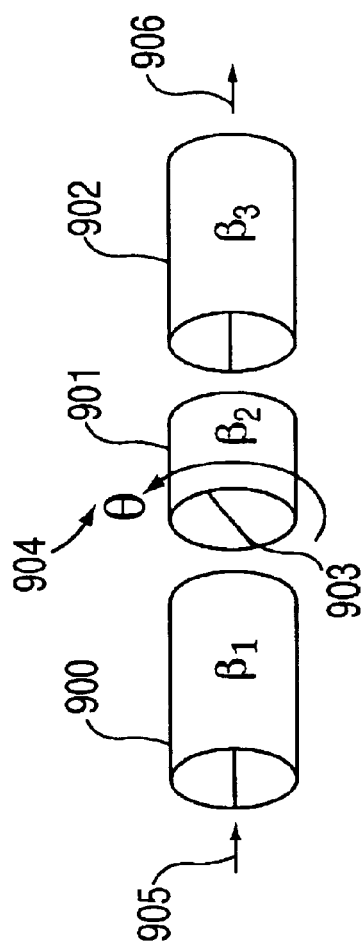
FIG. 23 shows a perspective view of another illustrative concatenation of three birefringent crystals with respective birefringent axes that are rotated such that no two adjacent orientations are either parallel or perpendicular according to this invention.
Figure 24:
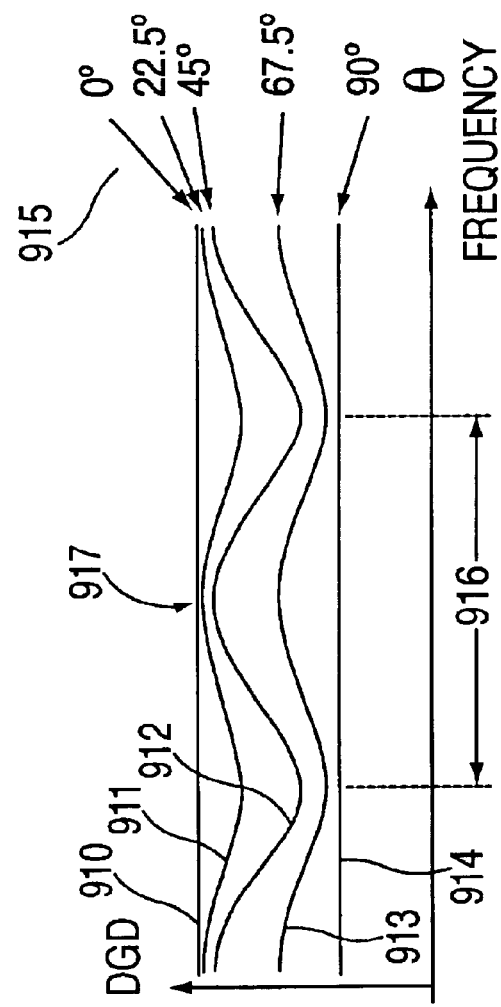
FIG. 24 shows five illustrative DGD spectra corresponding to the concatenation of three birefringent crystals shown in FIG. 23 for five different angular positions of the middle crystal according to this invention.

FIG. 23 shows illustrative birefringent crystals 900, 901, and 902. PMD is imparted onto input optical beam 905, with resultant output optical beam 906. Birefringent axis 903 of center crystal 901 is further rotated about the longitudinal axis by angle 904. FIG. 24 shows illustrative DGD spectra for five different angles 904 of birefringent axis 903. Within the range 0 degrees to 90 degrees, DGD spectra 910, 911, 912, 913, 914, and 915 correspond to birefringent axis 903 angles 0, 22.5, 45, 67.5, and 90 degrees. As crystal 901 is rotated through angle 904, the DGD spectrum changes shape, starting and ending in flat lines with intermediate undulation of the spectrum. Although spectral shapes 910 thru 915 change, free-spectral-range 916 remains fixed, and further the frequency location of DGD maximum 917 also remains fixed. Thus, by varying the amount of polarization mode-mixing between birefringent elements in a PMD generator, the DGD spectrum shape will change—but with no frequency shift. According to one aspect of this invention, a PMD spectrum can be phase (i.e., frequency) shifted without concomitant change of the PMD spectral shape.

Figure 25:
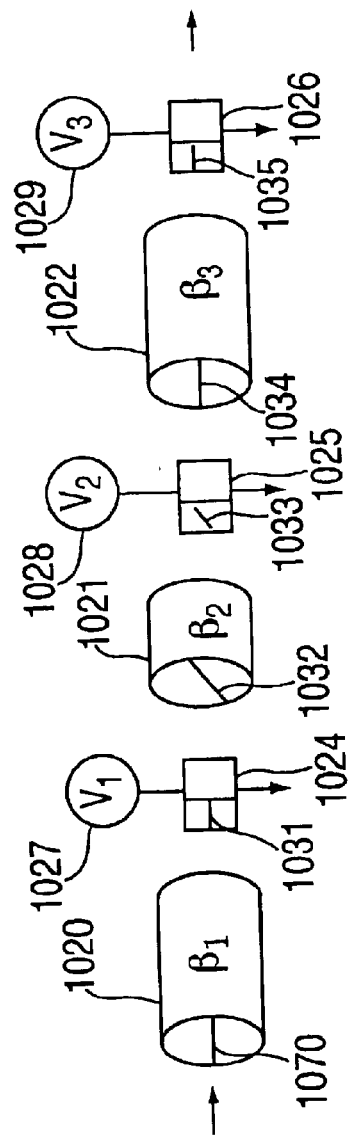
FIG. 25 shows a perspective view of another PMD generator that is similar to the one shown in FIG. 23, except that electro-optic elements have been added to each birefringent stage according to this invention.
Figure 26:
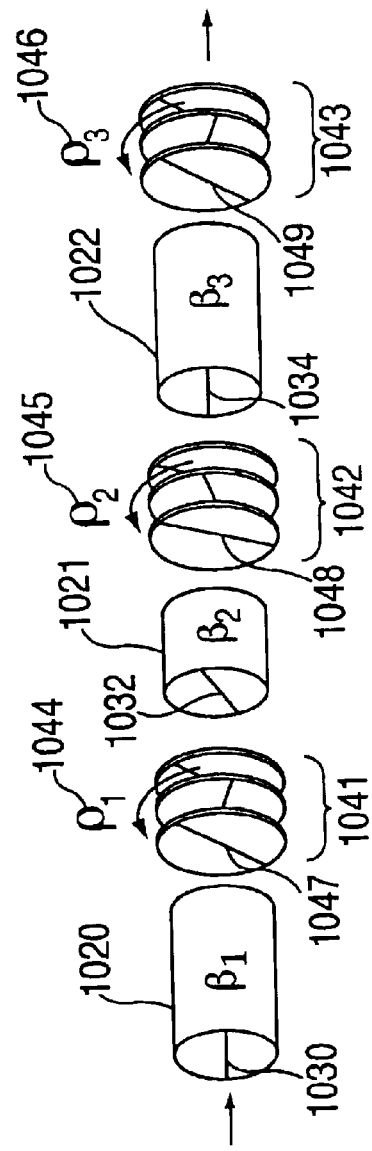
FIG. 26 shows a perspective view of yet another PMD generator that is similar to the one shown in FIG. 23, except that sets of waveplates have been added to each birefringent stage according to this invention.

FIGS. 25 and 26 show two illustrative PMD generators that are capable of continuous frequency shifting according to this invention. FIG. 25 uses electro-optic elements (see also, FIG. 9). FIG. 26 utilizes phase shifting elements (see also FIG. 13).

FIG. 25 shows a PMD generator that is similar to the one shown in FIG. 23, except that electro-optic elements have been added to each birefringent element (i.e., stage). In particular, electro-optic phase shifters 1024, 1025, and 1026 follow birefringent elements 1020, 1021, and 1022, respectively. Together, each birefringent element and associated EO phase shifter form a pair. Within each pair, birefringent axis 1030 and principal axis 1031 can be substantially parallel or substantially perpendicular to minimize polarization mode mixing. It will be appreciated that the specific order of birefringent element and phase shifter within a pair is unimportant and can be reversed. Voltage sources 1027, 1028, and 1029 can apply potentials to phase shifters 1024, 1025, and 1026, respectively, to control the frequency shift of each birefringent element. In general each of the applied voltages can be different as long as, together, they produce a PMD spectral shape that is substantially preserved during frequency shifting.

FIG. 26 shows another embodiment of a PMD generator according to this invention using waveplate phase shifting elements 1041, 1042, and 1043 instead of the phase shifting elements 1024, 1025, and 1026 shown in FIG. 25. The leading quarter-wave waveplate birefringent axes 1047, 1048, and 1049 are rotated by 45 degrees with respect to birefringent axes 1030, 1032, and 1034, respectively. Half-wave waveplate angles 1044, 1045, and 1046 are used to control the amount of frequency shifting that occurs for each birefringent element. Again, in general, the angle of each waveplate can be different such that, together, they produce PMD spectral shape that is substantially preserved during frequency shifting.

Figure 27:
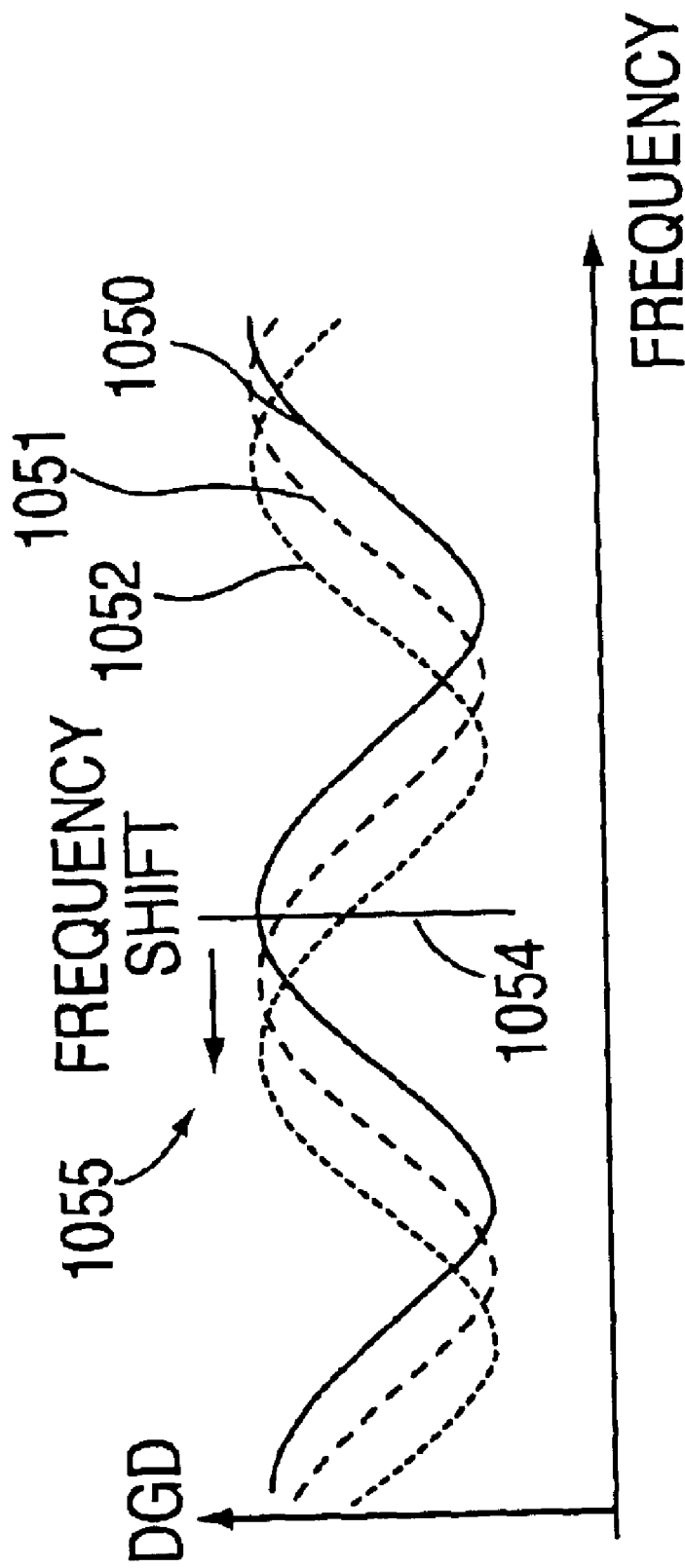
FIG. 27 shows three illustrative intensity spectra of the output beam of the apparatus shown in either FIG. 25 or FIG. 26, which are shifted in frequency without substantially changing their spectral shape, according to this invention.

FIG. 27 shows illustrative DGD spectra 1050, 1051, and 1052 as it is shifted in frequency without substantially changing its spectral shape. As explained more fully below, in order to induce an amount of frequency shift 1055 with respect to reference frequency 1054, correct phase-shift control within each birefringent stage is required.

Figure 28:
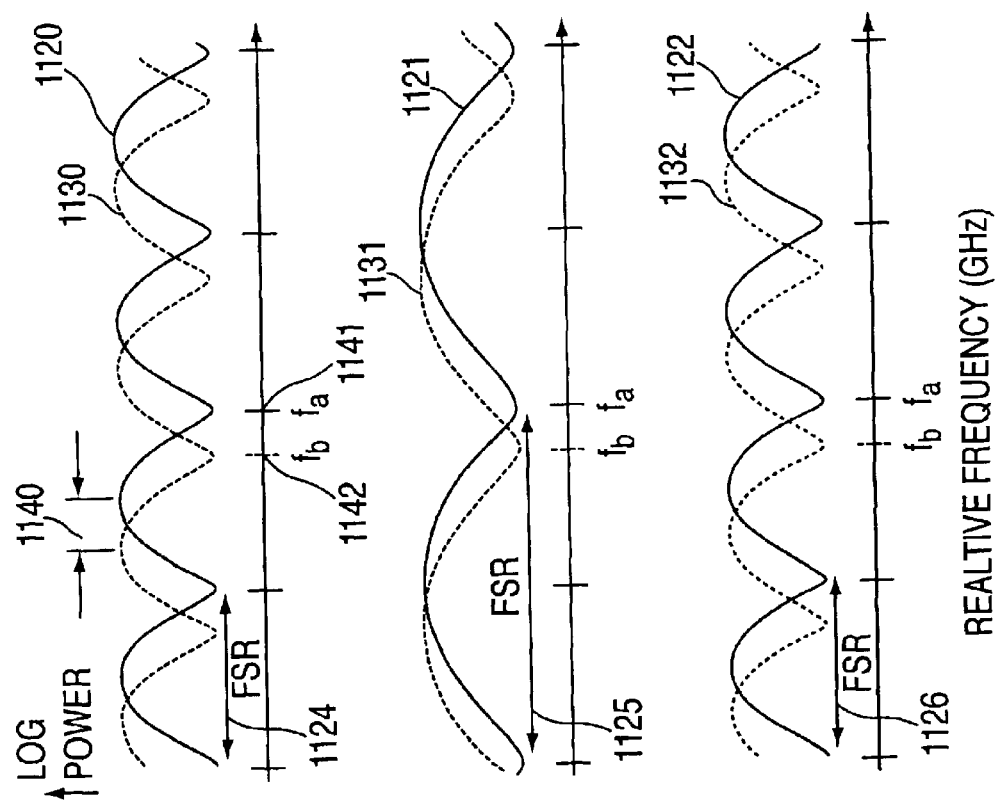
FIG. 28 shows illustrative optical intensity spectra for each birefringent element in either of FIGS. 25 or 26, according to this invention.

FIG. 28 shows illustrative optical intensity spectra for each birefringent element in either of FIGS. 25 or 26, for example. Spectra 1120, 1121, and 1122 correspond to spectra generated by birefringent elements 1020, 1021, and 1022, respectively, when the birefringent elements are separately placed between cross polarizers, as shown in FIG. 6. Each birefringent element 1020, 1021, and 1022 has corresponding free spectral ranges 1124, 1125, and 1126, respectively.

In order to phase shift DGD spectrum 1050 while keeping the spectral shape substantially intact, frequency shift 1140 must be applied to each birefringent element of FIG. 25. Accordingly, DGD spectra 1130, 1131, and 1132 illustrate common frequency shift 1140 from reference frequency 1141 to reference frequency 1142. However, because each birefringent element has a different FSR, the phase shift required to achieve common frequency shift 1140 differs for each birefringent element. The required phase shift used by phase shifters 1024, 1025, and 1026, or alternatively 1041, 1042, and 1043, can be calculated by 2□ multiplied by frequency shift 1140 and divided by the respective FSR 1124, 1125, and 1126. Consequently, in general, the phase shift from birefringent stage to stage differs. In the special case when the FSR's of all birefringent elements in a concatenation are the same, the phase shifts for each corresponding phase shifter are the same.

Figure 29:
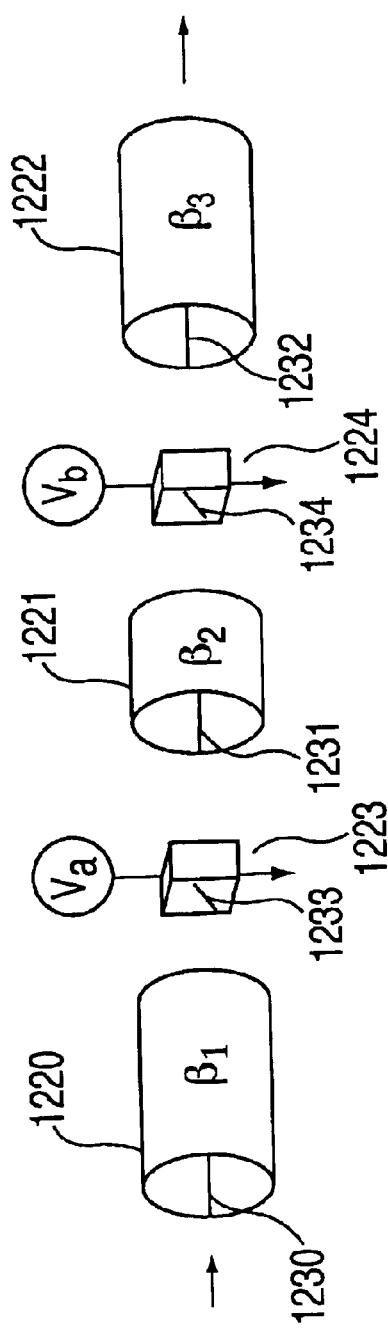
FIG. 29 shows a perspective view of three birefringent stages with two electro-optic mode mixing elements according to this invention.
Figure 30:
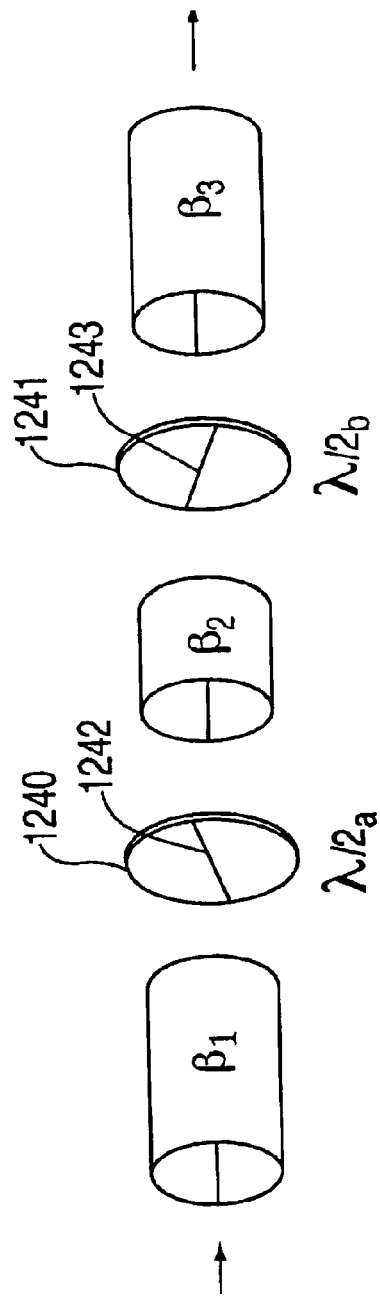
FIG. 30 shows a perspective view of three birefringent stages with two half-wave mode-mixing waveplates according to this invention.

Phase-shifting and mode-mixing are preferably performed independently. From stage to stage the polarization mode mixing is controlled by the rotation of one stage with respect to another. The corresponding phase shifter, however, of a birefringent/phase shifting elemental pair must also be rotated in order to maintain zero polarization mode mixing within the pair. Thus, FIGS. 29 and 30 illustrate alternative embodiments according to this invention. In both cases, the birefringent axes of all birefringent elements are aligned and the function of polarization mode mixing is performed by additional elements.

In FIG. 29, birefringent elements 1220, 1221, and 1222 have birefringent axes 1230, 1231, and 1232 aligned. Intermediate mode-mixing electro-optic elements 1223 and 1224 are located between birefringent elements 1220 and 1221, and elements 1221 and 1222, respectively. The orientation of principal axes 1233 and 1234 of mode-mixing electro-optic elements 1223 and 1224, respectively, are neither parallel nor perpendicular to the birefringent axes of birefringent elements 1220, 1221, and 1222. Advantageously, principal axes 1233 and 1234 are oriented at 45 degrees with respect to birefringent axis 1230 to maximize the possible mode mixing. As shown in FIG. 29, the mode mixing from stage to stage is controlled by voltages $V_a$ and $V_b$.

Alternatively, as shown in FIG. 30, half-wave mode-mixing waveplates 1240 and 1241 can be located between birefringent elements 1220 and 1221, and elements 1221 and 1222, respectively. The longitudinal (i.e., azimuth) angle of waveplate birefringent axes 1242 and 1243 determines the mode mixing from stage to stage.

Figure 31:
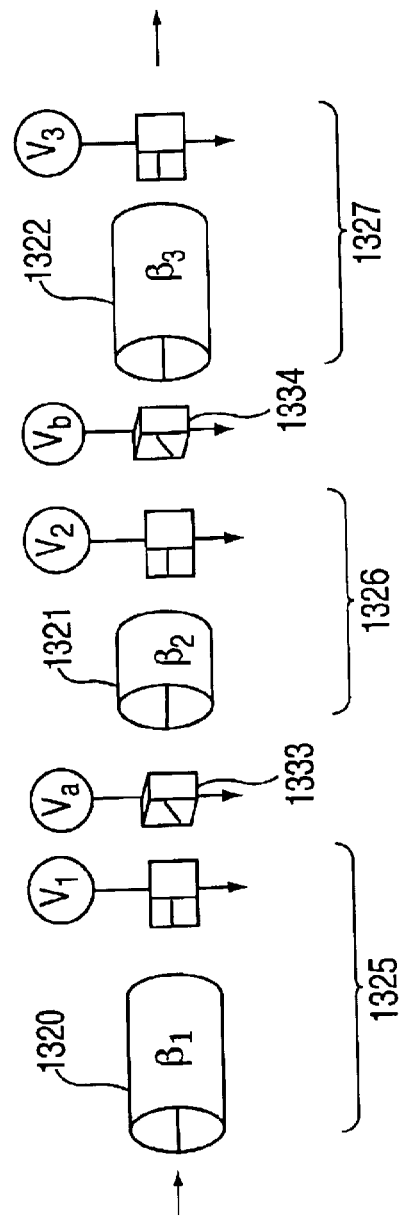
FIG. 31 shows a perspective view of a PMD generator including three birefringent stages, each of which includes a birefringent element, and two electro-optic phase shifting elements between the stages, such that substantially no polarization mode mixing occurs across the birefringent and phase shifting elements according to this invention.
Figure 32:
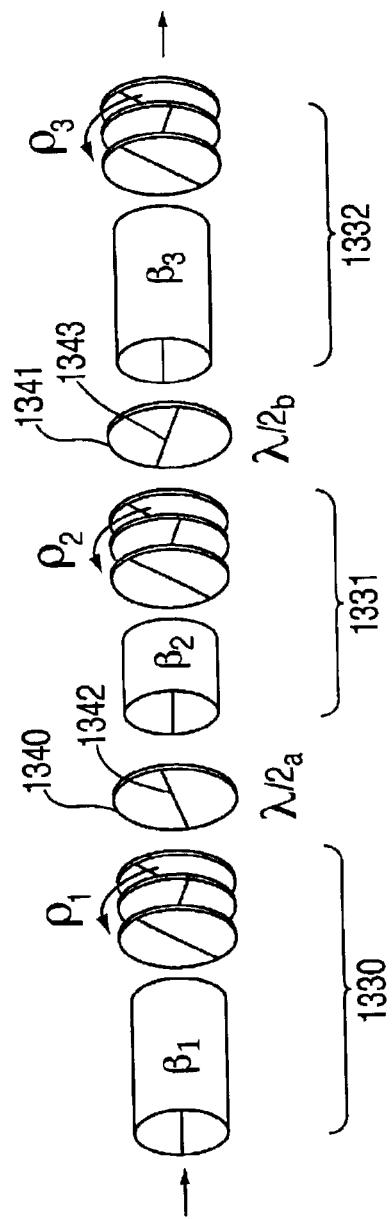
FIG. 32 shows a perspective view of another PMD generator including three birefringent stages, each of which includes a birefringent element, and two waveplate phase shifting elements located between the stages, such that substantially no polarization mode mixing occurs across the birefringent and phase shifting elements according to this invention.

FIGS. 31 and 32 show illustrative apparatus according to this invention using the alternative mode-mixing architectures of FIG. 29. As shown in FIG. 31, birefringent stages 1325, 1326, and 1327 each include a birefringent element and a phase shifting element such that substantially no polarization mode mixing occurs across the birefringent and phase shift elements. Polarization mode mixing is controlled by voltages $V_a$ and $V_b$ as applied to intermediate mode-mixing electro-optic elements 1333 and 1334. The requisite voltages to frequency shift the resultant PMD spectrum with its shape substantially unchanged is the same as taught above with respect to FIG. 28.

FIG. 32 is a waveplate alternative to the apparatus shown in FIG. 31. In this case, polarization mode mixing is controlled by birefringent-axis angles 1342 and 1343 of waveplates 1340 and 1341. Phase shifting is controlled by center waveplates angles p1, p2, and p3, where the requisite angles in order to frequency shift the resultant PMD spectrum with its shape substantially intact is the same as taught in FIG. 29.

Controlled PMD generation with the ability to frequency shift while substantially maintaining the PMD spectrum has useful applications for PMD emulation and PMD compensation. In a PMD compensator, it is possible that the PMD generator within the PMD compensator has generated the optimal spectrum for compensation of an optical communications link, but that spectrum may not be frequency aligned, for example, to produce the best compensation result. As another example, sophisticated testing of an optical receiver of an optical communications network can require the use of a range of PMD spectra. An important example is the case where a transmission fiber is mechanically stable (e.g., it may be buried), but thermally unstable. Such a case is known to result in a frequency shifting of the otherwise intact PMD spectrum. This effect can be observed in the lab on long spools of PMD-impaired fiber placed in an isolation chamber.

Figure 33:
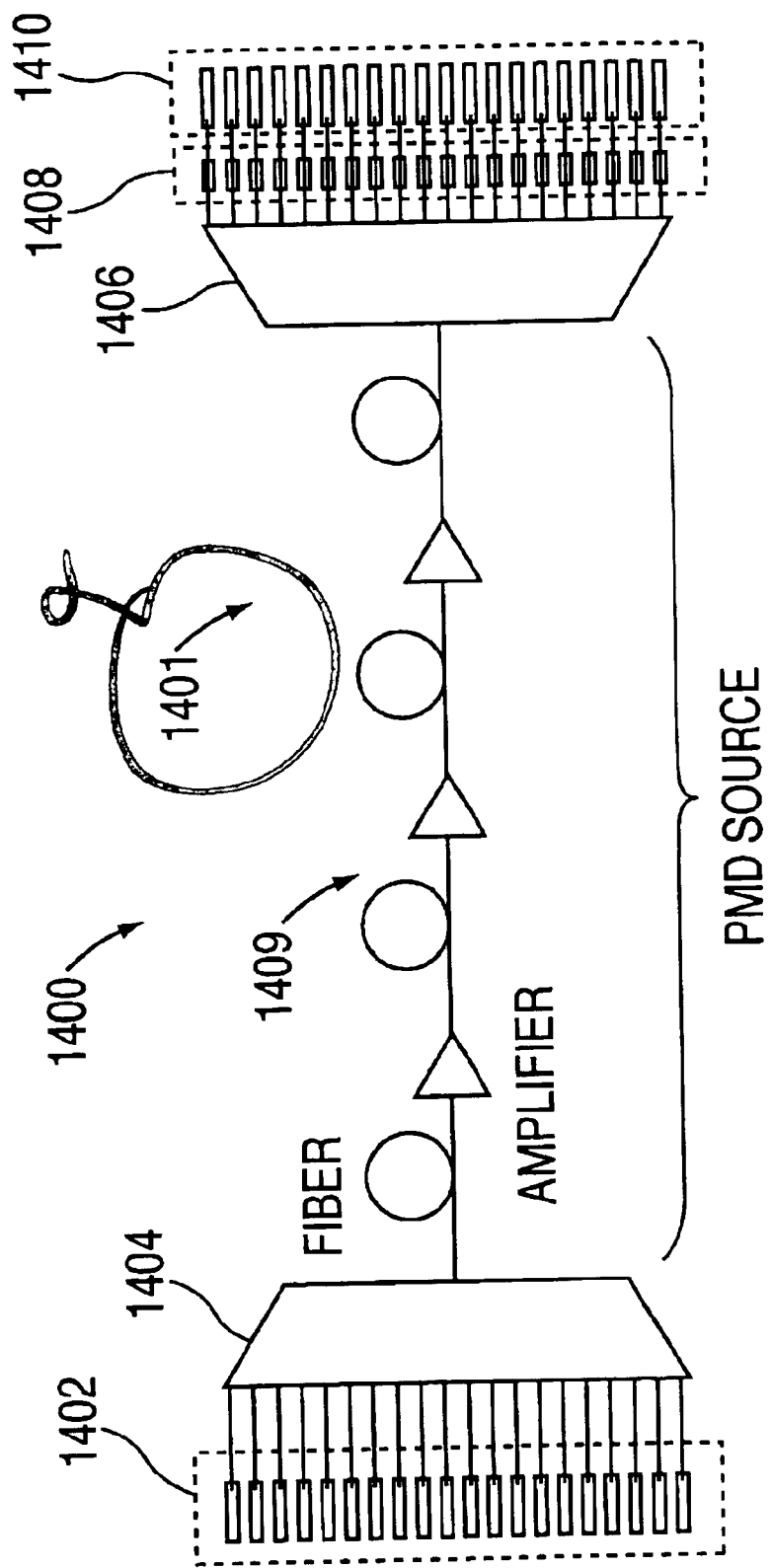
FIG. 33 shows a schematic block diagram of an illustrative architecture for a WDM transmission system, including PMD compensators, according to this invention.

FIG. 33 illustrates a basic architecture for WDM transmission system 1400. A number of laser transmitters 1402, each with distinct center frequencies and with distinct signal information, generate separate optical signals. Using optical multiplexer (hereinafter, "MUX") 1404, the generated optical signals are combined and transmitted along optical transmission line 1409. Transmission line 1409 can include any number of fiber and optical amplifier stages (shown), each of which can act as PMD impairment sources. After transmission across line 1409, the transmitted signal is separated by frequency with optical demultiplexer (hereinafter, "DMUX") 1406. Typically, each signal frequency is then detected at dedicated optical receiver 1410.

In many systems, the transmission of the combined signal information impairs the signals as a result of PMD. Accordingly, PMD compensators 1408 can be placed between optical DMUX 1406 and receiver 1410 to mitigate, in part or in full, the PMD impairment from the transmission of the combined signal. As shown in FIG. 33, one PMD compensator can be provided for each receiver.

Figure 34:
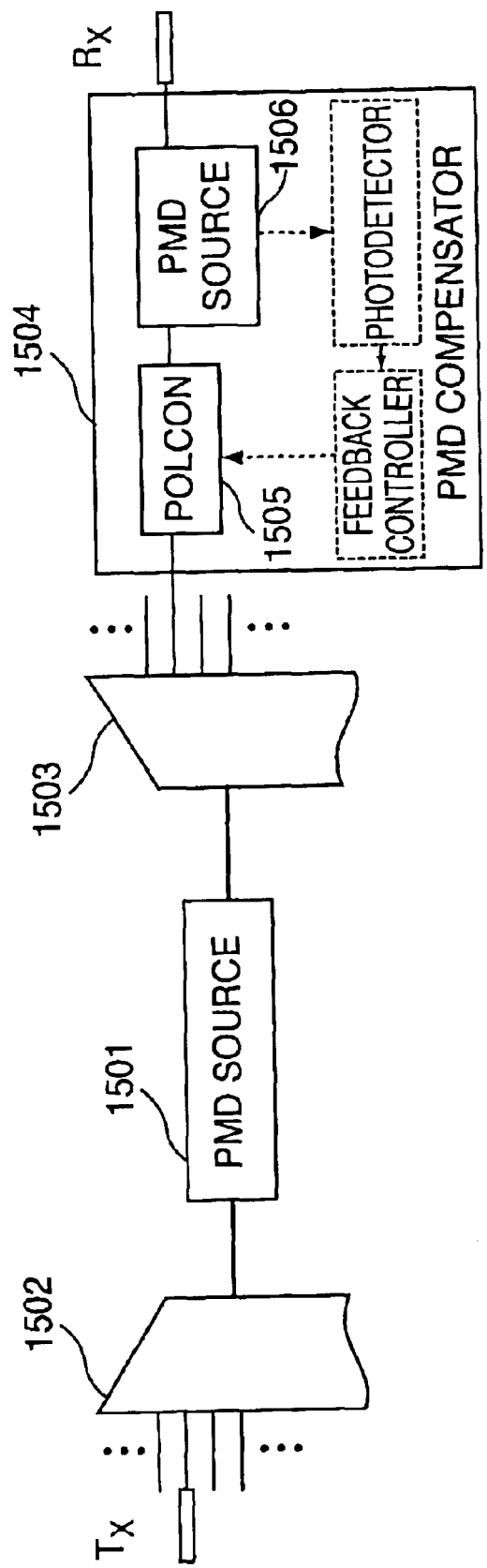
FIG. 34 shows a schematic block diagram of an illustrative architecture for a WDM transmission system that includes two PMD generators according to this invention.

FIG. 34 shows two locations that a controlled PMD generation source can be located in a WDM system. PMD generator 1501 is located between multiplexer 1502 and demultiplexer and 1503 and can be used to emulate PMD, to test, for example, the WDM system against PMD tolerance. PMD generator 1506, which is located in PMD compensator 1504, can also be used to mitigate PMD. Either one, or both, PMD generators can be used in a link, and can be constructed with more than two birefringent stages. When PMD generators 1501 or 1504 are further provided with frequency shift capability, according to this invention, PMD emulation and/or PMD compensation can be improved.

FIGS. 35–42 provide a number of illustrative applications of frequency-shift-enabled PMD generators.

Figure 35:
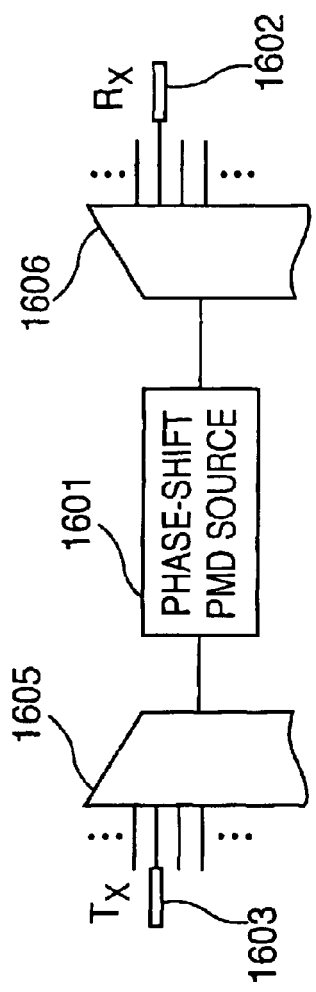
FIG. 35 shows a schematic block diagram of an illustrative architecture for a WDM transmission system that includes an illustrative frequency-shift-enabled PMD generator between a MUX/DMUX pair according to this invention.
Figure 36:
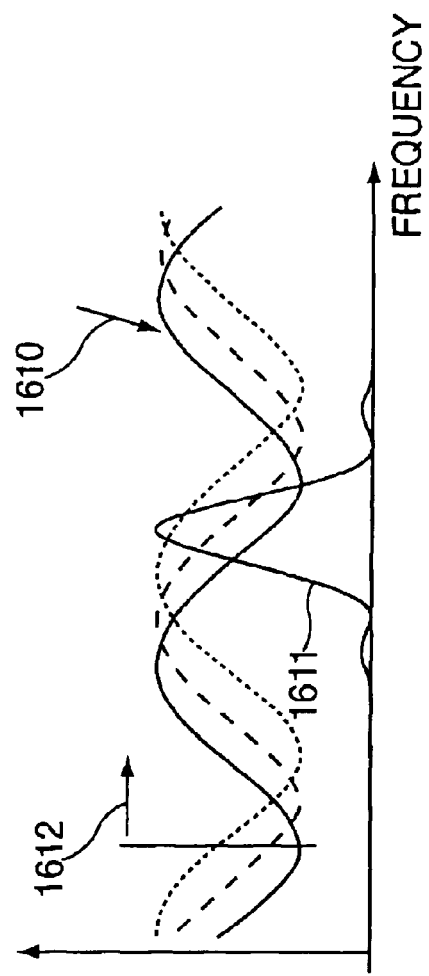
FIG. 36 illustrates the relationship between a DGD spectrum, which can be generated by a PMD source, and channel spectrum of optical data signal, which can be generated by a transmitter, according to this invention.

FIG. 35 shows illustrative frequency-shift-enabled PMD generator 1601 located between a MUX/DMUX pair 1605 and 1606. Optical data signal generated by transmitter 1603 can be impaired by PMD source 1601, which can in turn produce data errors at receiver 1602. FIG. 36 illustrates the relationship between a DGD spectrum, which can be generated by PMD source 1601, and channel spectrum 1611 of optical data signal, which can be generated by transmitter 1603. DGD spectrum 1610 can be frequency shifted by an amount 1612 across optical power (e.g., channel spectrum) 1611 to measure the sensitivity of receiver 1602 to varying types of PMD.

FIG. 37 illustrates frequency-shift-enable PMD generator 1701, which is located between a MUX/DMUX pair 1706 and 1707. Moreover, PMD compensator 1703 is located before receiver 1704, and in which PMD generator 1702 is located. Generally, generator 1702 uses one or two birefringent stages to generate a frequency-independent PMD spectrum, but can use more if necessary. FIG. 38 illustrates the relationship between PMD spectrum 1710 generated by PMD generator 1701, PMD 1712 generated by PMD generator 1702, and channel spectrum 1714 generated by transmitter 1705. PMD spectrum 1710 can be frequency shifted by amount 1711 as required. PMD spectrum 1712 is frequency independent, but magnitude 1713 of DGD spectrum 1712 can vary. Receiver 1704 can be tested against PMD impairment sensitivity by driving frequency shift 1711 and having PMD compensator 1703 adjust DGD magnitude 1713 as necessary to best mitigate data errors at the receiver.

FIG. 39 illustrates frequency-shift-enabled PMD generator 1801 located between a MUX/DMUX pair 1806 and 1807. Moreover, PMD compensator 1803, which is located before receiver 1804, also includes PMD source 1802, which is located within PMD compensator 1803 and also is phase-shift enabled. FIG. 40 illustrates the relationship between PMD spectrum 1810, which is generated by PMD generator 1801, PMD spectrum 1812, which is generated by PMD generator 1802, and channel spectrum 1815, which is generated by transmitter 1805. PMD spectrum 1810 can have frequency shift 1811 as required. PMD spectrum 1812 can have frequency shift 1813, modulation depth (i.e., DGD minimum to maximum) 1814, and overall spectral shape adjusted as required. It will be appreciated that the free-spectral ranges of PMD spectra 1810 and 1812 need not be the same, because PMD sources 1801 and 1802 can be different. Receiver 1804 can be tested against PMD impairment sensitivity by driving frequency shift 1811 of PMD spectrum 1810 and having PMD compensator 1803 adjust frequency shift 1813, DGD minimum to maximum 1814, and overall spectral shape as necessary to best mitigate data errors at said receiver.

Figure 41:
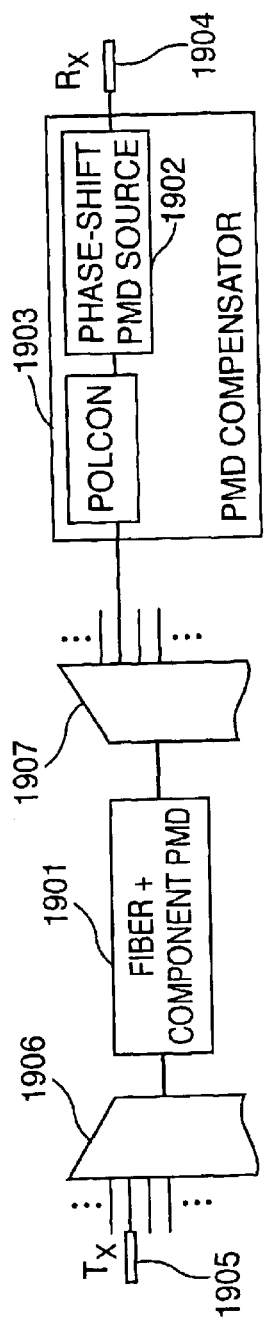
FIG. 41 shows a schematic block diagram of an illustrative architecture for a WDM transmission system that includes an illustrative frequency-shift-enabled PMD generator in a PMD compensator according to this invention.

FIG. 41 shows another illustrative PMD source 1901 located between a MUX/DMUX pair 1906 and 1907, wherein the PMD is generated by optical fiber and components. For example, 1901 can represent an installed fiber link between two cities. PMD compensator 1903 is located before receiver 1904, where PMD source 1902 located within PMD compensator 1903 is frequency-shift enabled.

Figure 42:
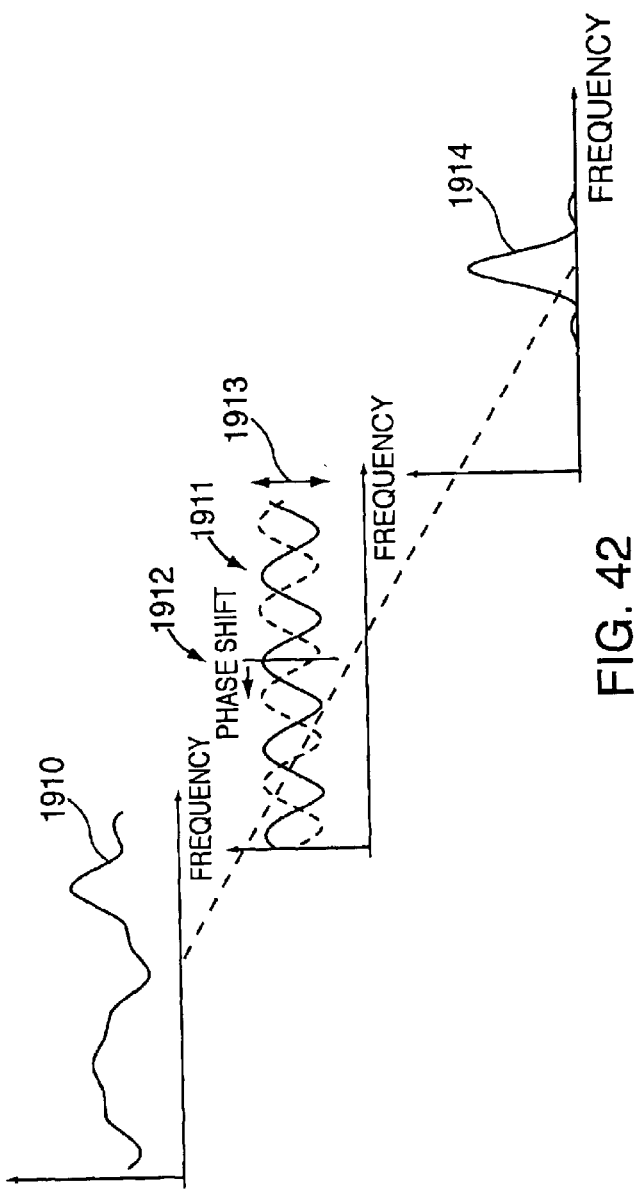
FIG. 42 illustrates the relationship between a PMD spectra generated between the MUX/DMUX pair from fiber and other optical components of FIG. 41, a frequency-shift-enabled PMD generator in a PMD compensator, and a channel spectrum generated by a transmitter of FIG. 41, according to this invention.

FIG. 42 illustrates the relationship between PMD spectrum 1910 generated by PMD source 1901, PMD spectrum 1912 generated by PMD source 1902, and optical power channel spectrum 1914 generated by transmitter 1905. PMD spectrum 1910 can vary randomly with time in both shape and magnitude. PMD spectrum 1911 can have frequency shift 1912, variable modulation depth (i.e., DGD minimum to maximum) 1913, and overall spectral shape adjusted as required. Receiver 1904 can be tested against PMD impairment due to optical fiber and components by having PMD compensator 1903 adjust frequency shift 1912, DGD minimum to maximum 1913, and overall spectral shape as necessary to best mitigate data errors at said receiver.

Thus, a PMD generator for improved PMD compensation is provided. One skilled in the art will appreciate that the present invention can be practiced by other than the described embodiments, which are presented for purposes of illustration and not of limitation, and the present invention is limited only by the claims which follow.

What is claimed is:

1. A polarization mode dispersion generator for generating a PMD spectrum, wherein said generator comprises a plurality of birefringent stages in optical series, wherein each of said stages comprises a differential group delay ("DGD") element and a phase-shifting element, and wherein said generator is capable of inducing an amount of polarization mode-mixing between at least one adjacent pair of said stages.

2. The generator of claim 1 wherein said PMD spectrum has a shape, and wherein said spectrum can be frequency shifted without substantially changing said shape by controlling said plurality of phase-shifting elements.

3. The generator of claim 2 wherein said PMD spectrum is periodic and can be continuously frequency shifted.

4. The generator of claim 1 wherein said PMD spectrum has a shape that can be changed, without frequency shifting, by varying said amount of polarization mode-mixing between said adjacent pairs of said stages.

5. The generator of claim 1 wherein:
each of said stages has a total amount of retardation and each of said DGD elements has a respective DGD value; and wherein
each of said phase-shifting elements provides an appropriate amount of optical retardation such that each said total amount of retardation is substantially the same.

6. The generator of claim 1 wherein each of said stages has an associated free spectral range and wherein each of said phase-shifting elements provides an amount of phase-shift substantially equal to $2\pi$ multiplied by a desired frequency shift of said PMD spectrum divided by the free spectral range of a DGD element.

7. The generator of claim 1 wherein, for each stage, said DGD element and said phase-shifting element are oriented such that substantially no polarization mode-mixing occurs therebetween.

8. The generator of claim 1 wherein said generating said PMD spectrum incurs no substantial loss, said loss selected from a group consisting of polarization dependent loss, frequency dependent loss, and a combination thereof.

9. The generator of claim 1 wherein said DGD element comprises at least one birefringent dielectric media.

10. The generator of claim 9 wherein said dielectric media is a birefringent crystal selected from a group consisting of yttrium ortho-vanadate, rutile, lithium niobate, crystalline quartz, alpha-barium borate, and any combination thereof.

11. The generator of claim 1 further comprising a polarization mode-mixing element between each adjacent pair of said stages.

12. The generator of claim 11 the number of said mode-mixing elements is one less the number of birefringent stages.

13. The generator of claim 11 further comprising a controller coupled to each of said polarization mode-mixing elements for controlling said amount of mode-mixing between each adjacent pair of stages.

14. The generator of claim 1 further comprising a controller coupled to each of said stages for controlling said amount of mode-mixing between adjacent pairs of stages.

15. The generator of claim 1 wherein said generator is capable of inducing an amount of polarization mode-mixing between each adjacent pair of said stages.

16. The generator of claim 1 wherein each of said phase-shifting elements has an associated optical retardation, and wherein said generator is tunable by varying said amount of associated optical retardation.

17. The generator of claim 16 further comprising a plurality of controllers, each of which is coupled to one of said phase-shifting elements for controlling said amount of associated optical retardation.

18. The generator of claim 17 wherein each of said stages has an associated free spectral range and each of said phase-shifting element controllers is programmed to induce said amount of associated optical retardation equal to an amount of phase-shift substantially equal to $2\pi$ multiplied by a desired frequency shift of said PMD spectrum divided by the free spectral range of a DGD element.

19. The generator of claim 18 wherein each of said phase-shifting element controllers is programmed to induce said amounts of associated optical retardation such that each stage has a total amount of optical retardation that is substantially the same.

20. The generator of claim 1 wherein said phase-shifting element comprises an electro-optic element.

21. The generator of claim 20 wherein said PMD spectrum can be continuously frequency shifted by continuously varying a voltage applied to said electro-optic element.

22. The generator of claim 1 wherein each of the birefringent stages has an optical retardation and an associated free-spectral range, and wherein said PMD spectrum has a period equal to said free spectral range.

23. The generator of claim 22 wherein said free-spectral range is about 100 GHz.

24. The generator of claim 1 wherein, for at least one stage, said DGD element comprises a high-birefringent crystal having an extraordinary axis and said phase-shifting element comprises an electro-optic crystal having a principal axis.

25. The generator of claim 24 wherein said extraordinary axis and said principal axis are substantially parallel or substantially perpendicular to minimize polarization mode-mixing between said high-birefringent and electro-optic crystals.

26. The generator of claim 24 wherein said at least one stage further comprises a voltage source for applying a potential difference across said electro-optic crystal.

27. The generator of claim 26 wherein said at least one stage comprises all of said stages.

28. The generator of claim 26 wherein said potential difference across each of said electro-optic crystals is sufficient to generate a PMD spectral shape that is substantially preserved during frequency shifting.

29. The generator of claim 28 wherein said potential difference across at least two of said electro-optic crystals is different.

30. The generator of claim 26 further comprising a voltage source controller for controlling said potential difference to select an amount of PMD spectral frequency shifting.

31. The generator of claim 1 wherein, for at least one stage, said DGD element comprises a high-birefringent crystal and said phase-shifting element comprises a plurality of waveplates.

32. The generator of claim 31 wherein said plurality of waveplates comprises a first quarter-wave waveplate and a second quarter-wave waveplate having birefringent axes that are substantially parallel to each other and substantially perpendicular to an optical beam's propagation axis.

33. The generator of claim 32 wherein said plurality of waveplates further comprises a half-wave waveplate, having a birefringent axis, located between said quarter-wave waveplates, and wherein said half-wave birefringent axis can rotate about said propagation axis with respect to said quarter-wave waveplate birefringent axes.

34. The generator of claim 33 wherein said at least one stages includes all said stages, and wherein each of said half-wave waveplates can be rotated about a beam propagation axis with respect to its respective quarter-wave waveplates to control the amount of frequency shifting that occurs for each birefringent element.

35. The generator of claim 33 wherein said quarter-wave and half-wave waveplates have essentially no polarization effect when said half-wave birefringent axis is substantially perpendicular to said birefringent axes of said quarter-wave waveplates.

36. The generator of claim 33 wherein said high-birefringent crystal is optically aligned with a first of said quarter-wave waveplates, and wherein said high-birefringent crystal has a birefringent axis that is oriented at an angle that is substantially 45 degrees with respect to a birefringent axis of said first quarter-wave waveplate.

37. The generator of claim 33 wherein said PMD spectrum has a shape, and wherein said spectrum can be frequency shifted without substantially changing said shape by rotating said half-wave waveplate.

38. The generator of claim 1 wherein each of said phase-shifting elements can induce a respective amount of phase-shift that is independent from the amount of polarization mode-mixing between said adjacent stages.

39. A polarization mode dispersion compensator comprising:
a polarization controller having an optical input for receiving an optical signal having polarization mode dispersion and an optical output for providing an optical signal with a transformed state of polarization; and
a PMD generator having an input in optical alignment with said output of said controller, said generator being for generating a PMD spectrum that can be added to said transformed optical signal, said PMD spectrum having a shape, and wherein said spectrum can be frequency shifted without substantially changing said shape.

40. The compensator of claim 39 further comprising:
a photodetector that converts at least a portion of the transformed optical signal into an electrical signal; and
a feedback controller coupled to said photodetector for receiving said electrical signal and coupled to said controller and said generator for generating and providing control signals based on said electrical signal for compensating said polarization mode dispersion.

41. The compensator of claim 40 wherein said feedback controller is programmed to frequency shift the PMD spectra to optimize said compensation.

42. A method for generating a polarization mode dispersion spectrum having a spectral shape using a polarization mode dispersion generator, wherein said generator comprises a plurality of birefringent stages in optical series, wherein each of said stages comprises (1) a differential group delay ("DGD") element having a respective delay and (2) a phase-shifting element having an associated optical retardation, said generator also having an amount of polarization mode-mixing between at least one adjacent pair of said stages, said method comprising:
varying said associated optical retardations such that said spectrum shifts with respect to frequency without substantially changing said spectral shape.

43. The method of claim 42 wherein said varying causes said spectrum to shift continuously.

44. The method of claim 42 wherein each of said stages has an associated free spectral range and wherein said varying comprises adjusting each of said phase-shifting elements to provide an amount of phase-shift substantially equal to $2\pi$ multiplied by a desired frequency shift of said PMD spectrum divided by the free spectral range of a DGD element.

45. The method of claim 42 wherein said varying comprises, for at least one of said stages, oriented said DGD element and said phase-shifting element such that substantially no polarization mode-mixing occurs therebetween.

46. The method of claim 42 wherein said generator further comprises a plurality of controllers, each of controllers being coupled to one of said phase-shifting elements, and wherein said varying is controlled by said controllers.

47. The method of claim 42 wherein said varying comprises inducing said amount of associated optical retardation in each phase-shifting element such that each stage has substantially the same amount of optical retardation.

48. The method of claim 47 wherein said varying comprises inducing the same amount of associated optical retardation in each phase-shifting element.

49. The method of claim 42 wherein each of said phase-shifting elements comprises an electro-optic element, and wherein said varying comprises applying a voltage to each of said electro-optic elements.

50. The method of claim 49 wherein said generator further comprises a voltage source, and wherein said varying comprises controlling said voltage to select an amount of PMD spectral frequency shifting.

51. The method of claim 42 wherein, for at least one stage, said DGD element comprises a high-birefringent crystal and said phase-shifting element comprises a plurality of waveplates, and wherein said varying comprises rotating at least one of said waveplates.

52. The method of claim 51 wherein said plurality of waveplates comprises a first quarter-wave waveplate and a second quarter-wave waveplate having birefringent axes that are substantially parallel to each other and substantially perpendicular to an optical beam's propagation axis, and a half-wave waveplate, having a birefringent axis, located between said quarter-wave waveplates, and wherein said varying comprises rotating said half-wave waveplate about said propagation axis with respect to said quarter-wave waveplate birefringent axes.

53. The method of claim 42 further comprising varying said amount of polarization mode-mixing to change said spectral shape.

54. The method of claim 53 wherein said varying said amount of mode-mixing is not performed while said varying said associated optical retardations.

55. The method of claim 53 wherein said varying said amount of mode-mixing performed independently of said varying said associated optical retardations.

56. The method of claim 42 further comprising a polarization mode-mixing element having a polarization orientation and located between at least one adjacent pair of said stages, wherein said varying said amount of mode-mixing comprises varying said orientation of said mode-mixing element.

57. The method of claim 42 wherein said varying said amount of mode-mixing comprises rotating at least one of said adjacent stages.

* * * * *